(12) United States Patent
Ebara

(10) Patent No.: US 7,716,934 B2
(45) Date of Patent: May 18, 2010

(54) AIR CONDITIONING DEVICE

(75) Inventor: Toshiyuki Ebara, Ota (JP)

(73) Assignee: Sanyo Electric Co., Ltd., Tokyo (JP)

( * ) Notice: Subject to any disclaimer, the term of this patent is extended or adjusted under 35 U.S.C. 154(b) by 572 days.

(21) Appl. No.: 11/700,247

(22) Filed: Jan. 31, 2007

(65) Prior Publication Data

US 2007/0193290 A1 Aug. 23, 2007

(30) Foreign Application Priority Data

Jan. 31, 2006 (JP) .............................. 2006-022429
Jan. 31, 2006 (JP) .............................. 2006-022519

(51) Int. Cl.
*F25B 27/00* (2006.01)

(52) U.S. Cl. .......................... 62/113; 62/238.6; 62/513

(58) Field of Classification Search ................... 62/113, 62/238.6–238.7, 513
See application file for complete search history.

(56) References Cited

U.S. PATENT DOCUMENTS

| 4,833,893 | A  | * | 5/1989 | Morita | ......................... | 62/113 |
| 6,913,067 | B2 | * | 7/2005 | Hesse | ............................ | 165/43 |
| 6,986,264 | B1 | * | 1/2006 | Taras et al. | ..................... | 62/513 |
| 7,055,590 | B2 | * | 6/2006 | Hara | ........................... | 165/202 |

FOREIGN PATENT DOCUMENTS

| DE | 198 50 829 C1 | 3/2000 |
| EP | 198 18 649 A1 | 10/1999 |
| EP | 1 338 449 A1 | 8/2003 |
| EP | 1 701 112 A1 | 9/2006 |
| JP | 2002-98430 A | 4/2002 |
| WO | WO 2005/106341 A1 | 11/2005 |
| WO | WO 2006/027330 A1 | 3/2006 |

OTHER PUBLICATIONS

European Search Report issued in corresponding European Patent Application No. EP 07001908.8—2301, mailed May 15, 2007.

* cited by examiner

*Primary Examiner*—William E Tapolcai
(74) *Attorney, Agent, or Firm*—McDermott Will & Emery LLP

(57) ABSTRACT

An object is to improve performance and efficiency of an air conditioning device constituted of a waste heat utilization circuit in which waste heat of a heat source is utilized in heating a room to be conditioned in a heat exchanger for heating; a refrigerant circuit in which carbon dioxide is used as a refrigerant and which has a supercritical pressure on a high pressure side; and a cascade heat exchanger which performs heat exchange between a fluid flowing from the heat source to the heat exchanger for heating in the waste heat utilization circuit and the refrigerant of the refrigerant circuit, the refrigerant discharged from a compressor is passed through the cascade heat exchanger, the refrigerant discharged from the cascade heat exchanger is divided by a flow divider, one divided refrigerant is passed from an auxiliary pressure reduction unit to an internal heat exchanger to perform heat exchange between the refrigerant and the refrigerant discharged from the cascade heat exchanger and then sucked into an intermediate pressure section of the compressor, and the other divided refrigerant is passed from a main pressure reduction unit to a heat absorber and then sucked into a low pressure section of the compressor.

7 Claims, 10 Drawing Sheets

FIG. 5

|  | HEATING OPERATION TIME | COOLING/DRYING OPERATION TIME |
|---|---|---|
| AUXILIARY EXPANSION VALVE FOR HEATING 15 | OPEN DEGREE CONTROL | TOTALLY CLOSED |
| AUXILIARY EXPANSION VALVE FOR COOLING 16 | TOTALLY CLOSED | OPEN DEGREE CONTROL |
| EXPANSION VALVE FOR HEATING 20 | OPEN DEGREE CONTROL | TOTALLY CLOSED |
| EXPANSION VALVE FOR COOLING 21 | TOTALLY CLOSED | OPEN DEGREE CONTROL |
| ELECTROMAGNETIC VALVE 27 | TOTALLY OPENED | TOTALLY CLOSED |

HEATING CAPABILITY CHARACTERISTIC
(COMPARISON BETWEEN CONVENTIONAL EXAMPLE AND PRESENT INVENTION)

COOLING CAPABILITY CHARACTERISTIC
(COMPARISON BETWEEN CONVENTIONAL EXAMPLE AND PRESENT INVENTION)

AIR CONDITIONING DEVICE

BACKGROUND OF THE INVENTION

The present invention relates to an air conditioning device constructed by a waste heat utilization circuit for utilizing waste heat of a heat source in heating of a room to be conditioned in a heat exchanger for heating; a refrigerant circuit in which carbon dioxide is used as a refrigerant and which has a supercritical pressure on a high pressure side; and a cascade heat exchanger which performs heat exchange between a fluid flowing from the heat source to the heat exchanger for heating in the waste heat utilization circuit and a refrigerant of the refrigerant circuit.

Heretofore, this type of air conditioning device is constituted of a waste heat utilization circuit for utilizing waste heat of a heat source of an HEV, an FCV car air conditioner, an FC co-generation system or the like in heating a room to be conditioned in a heat exchanger for heating; a refrigerant including a compressor, a heat absorber disposed externally from the room to be conditioned, a pressure reduction unit and a heat exchanger for cooling which cools the room to be conditioned; a cascade heat exchanger which performs heat exchange between a fluid such as ethylene glycol flowing from the heat source to the heat exchanger for heating in the waste heat utilization circuit and a refrigerant of the refrigerant circuit and the like. The waste heat utilization circuit is provided with a circulation pump. When the circulation pump is operated, the fluid is circulated through the waste heat utilization circuit. The circulation of the fluid through the heat source is controlled by an electromagnetic valve and the like so as to pass the fluid through the heat source in a case where the waste heat of the heat source is utilized in heating the room to be conditioned during a heating operation.

That is, during the heating operation, the fluid heated by heat exchange between the fluid and the heat source is passed through the heat exchanger for heating to heat the room to be conditioned. To heat the heat source during starting, the circulation of the fluid through the heat source is stopped. In the cascade heat exchanger, the heat exchange between the refrigerant compressed by the compressor and the fluid flowing through the waste heat utilization circuit is performed to heat the fluid, and the heated fluid is passed through the heat exchange for heating to heat the room to be conditioned.

Moreover, during the heating operation, in the cascade heat exchanger, the heat exchange between the refrigerant compressed by the compressor and the fluid flowing through the waste heat utilization circuit is performed to heat the fluid. The heated fluid is passed through the heat exchanger for heating to heat the room to be conditioned. Moreover, after reducing pressure of the refrigerant which has radiated heat in the cascade heat exchanger by the pressure reduction unit, the refrigerant is evaporated by the heat absorber disposed externally from the room to be conditioned. To cool the heat source, heating is performed in the cascade heat exchanger in a first stage. In addition, heat from the heat source is applied to the fluid, and utilized in heating the room to be conditioned.

On the other hand, during a cooling operation, without operating the circulation pump of the waste heat utilization circuit, the compressor of the refrigerant circuit is operated, and the pressure of the refrigerant which has radiated heat in the heat exchanger disposed externally is reduced by the pressure reduction unit. Subsequently, the refrigerant is circulated through the heat exchanger for cooling to cool the room to be conditioned.

In addition, in recent years, a problem of global environment has been noticed, and carbon dioxide which is a natural refrigerant has been used as the refrigerant even in this type of air conditioning device. Since carbon dioxide has a characteristic as satisfactory as a global warming coefficient of 1, carbon dioxide has been noted as a substitute for a chlorofluorocarbon-based refrigerant. However, a critical point of the carbon dioxide refrigerant is about 7.31 MPa at 31.1° C., and the pressure of the refrigerant circuit on a high pressure side easily reaches a supercritical region. Especially, when the temperature of the fluid rises by cooling circulation of the heat source, capability of the heat exchange between the refrigerant and the fluid deteriorates. Therefore, after the radiation of the refrigerant, the temperature (at an outlet of the cascade heat exchanger) rises. This causes a problem that cooling/heating capability and efficiency remarkably deteriorate.

To avoid such deterioration of the efficiency, an air conditioning device is developed in which a heat exchanger is additionally disposed in a refrigerant circuit. A refrigerant which has radiated heat in a cascade heat exchanger is passed through the heat exchanger to perform heat exchange between the refrigerant and surrounding air (e.g., air of a room to be conditioned, etc.). In consequence, the refrigerant further radiates heat to thereby increase an enthalpy difference (see, e.g., Japanese Patent Application Laid-Open No. 2002-98430).

However, when the temperature of the air (e.g., the room to be conditioned or the like) to be subjected to the heat exchange between the air and the refrigerant in the heat exchanger rises, such a radiation effect cannot be obtained, and the efficiency disadvantageously remarkably deteriorates. Since the heat exchanger is disposed, the device enlarges and cost increases.

On the other hand, during the heating operation at a low outside air temperature, regardless of the efficiency, the room to be conditioned needs to be heated at an early stage to secure coziness.

SUMMARY OF THE INVENTION

The present invention has been developed in order to solve such a problem of a conventional technology, and an object thereof is to improve performance and efficiency of an air conditioning device constructed by a waste heat utilization circuit for utilizing waste heat of a heat source in heating a room to be conditioned in a heat exchanger for heating; a refrigerant circuit in which carbon dioxide is used as a refrigerant and which has a supercritical pressure on a high pressure side; and a cascade heat exchanger which performs heat exchange between a fluid flowing from the heat source to the heat exchanger for heating in the waste heat utilization circuit and a refrigerant of the refrigerant circuit.

An air conditioning device of a first invention is characterized by comprising: a waste heat utilization circuit which circulates a fluid through a heat source and a heat exchanger for heating and in which waste heat of the heat source is utilized in heating a room to be conditioned in the heat exchanger for heating; a refrigerant circuit in which carbon dioxide is used as a refrigerant and which has a supercritical pressure on a high pressure side; and a cascade heat exchanger which performs heat exchange between the fluid flowing from the heat source to the heat exchanger for heating in the waste heat utilization circuit and the refrigerant of the refrigerant circuit, the refrigerant circuit including a compressor, the cascade heat exchanger, a flow divider, an auxiliary pressure reduction unit, an internal heat exchanger, a main pressure reduction unit and a heat absorber disposed externally from the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, the other divided refrigerant being passed from the main pressure reduction unit to the heat absorber and being then sucked into a low pressure section of the compressor.

An air conditioning device of a second invention is characterized by comprising: a waste heat utilization circuit which circulates a fluid through a heat source and a heat exchanger for heating and in which waste heat of the heat source is utilized in heating a room to be conditioned in the heat exchanger for heating; a refrigerant circuit in which carbon dioxide is used as a refrigerant and which has a supercritical pressure on a high pressure side; and a cascade heat exchanger which performs heat exchange between the fluid flowing from the heat source to the heat exchanger for heating in the waste heat utilization circuit and the refrigerant of the refrigerant circuit, the refrigerant circuit including a compressor, the cascade heat exchanger, a flow divider, an auxiliary pressure reduction unit, an internal heat exchanger, a main pressure reduction unit and a heat exchanger for cooling which cools the main pressure reduction unit and the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, the other divided refrigerant being passed from the main pressure reduction unit to the heat exchanger for cooling and being then sucked into a low pressure section of the compressor.

An air conditioning device of a third invention is characterized by comprising: a waste heat utilization circuit which circulates a fluid through a heat source and a heat exchanger for heating and in which waste heat of the heat source is utilized in heating a room to be conditioned in the heat exchanger for heating; a refrigerant circuit in which carbon dioxide is used as a refrigerant and which has a supercritical pressure on a high pressure side; and a cascade heat exchanger which performs heat exchange between the fluid flowing from the heat source to the heat exchanger for heating in the waste heat utilization circuit and the refrigerant of the refrigerant circuit, the refrigerant circuit including a compressor, the cascade heat exchanger, a flow divider, an auxiliary pressure reduction unit, an internal heat exchanger, a main pressure reduction unit, a heat absorber disposed externally from the room to be conditioned and a heat exchanger for cooling which cools the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, during heating, the other divided refrigerant being passed from the main pressure reduction unit to the heat absorber and being then sucked into a low pressure section of the compressor, during cooling, the other divided refrigerant being passed from the main pressure reduction unit to the heat exchanger for cooling and being then sucked into the low pressure section of the compressor.

According to any one of the first invention to the third invention, the air conditioning device of a fourth invention is characterized in that the internal heat exchanger performs heat exchange between one refrigerant passed through the auxiliary pressure reduction unit and the refrigerant which has been discharged from the cascade heat exchanger and which has not been divided by the flow divider.

According to any one of the first invention to the fourth invention, the air conditioning device of a fifth invention is characterized in that one refrigerant is divided from an upper part and a lower part of the flow divider.

According to any one of the first invention to the fifth invention, the air conditioning device of a sixth invention is characterized in that the compressor includes low stage side compression means and high stage side compression means, the refrigerant discharged from the heat absorber or the heat exchanger for cooling is sucked into the low stage side compression means, an intermediate pressure refrigerant compressed by this low stage side compression means is sucked into the high stage side compression means together with one refrigerant discharged from the internal heat exchanger, and a ratio of a displacement capacity of the high stage side compression means to that of the low stage side compression means is set to 70% or more and 85% or less.

According to any one of the first invention to the sixth invention, the air conditioning device of a seventh invention is characterized by further comprising: temperature detection means for detecting a temperature of the refrigerant entering the main pressure reduction unit, the device being configured to control an open degree of the auxiliary pressure reduction unit so that the temperature detected by this temperature detection means indicates the minimum value.

According to any one of the first invention to the seventh invention, the air conditioning device of an eighth invention is characterized by further comprising: temperature detection means for detecting a temperature of the refrigerant of the intermediate pressure section of the compressor, the device being configured to control an open degree of the auxiliary pressure reduction unit so that the temperature detected by this temperature detection means indicates the maximum value.

An air conditioning device of a ninth invention is characterized by comprising: a waste heat utilization circuit which circulates a fluid through a heat source and a heat exchanger for heating and in which waste heat of the heat source is utilized in heating a room to be conditioned in the heat exchanger for heating; a refrigerant circuit in which carbon dioxide is used as a refrigerant and which has a supercritical pressure on a high pressure side; and a cascade heat exchanger which performs heat exchange between the fluid flowing from the heat source to the heat exchanger for heating in the waste heat utilization circuit and the refrigerant of the refrigerant circuit, the refrigerant circuit including a compressor, the cascade heat exchanger, a flow divider, an auxiliary pressure reduction unit, an internal heat exchanger, a main pressure reduction unit and a heat absorber disposed externally from the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, the other divided refrigerant being passed from the main pressure reduction unit to the heat absorber and being then sucked into a low pressure section of the compressor, the device being configured to control an open degree of the auxiliary pressure reduction unit so that a temperature of the one refrigerant discharged from the internal heat exchanger—a temperature of the one refrigerant entering the internal heat exchanger is 20 K or less and a superheat degree of the refrigerant of the intermediate pressure section of the compressor is 2 K or more.

An air conditioning device of a tenth invention is characterized by comprising: a waste heat utilization circuit which circulates a fluid through a heat source and a heat exchanger for heating and in which waste heat of the heat source is utilized in heating a room to be conditioned in the heat exchanger for heating; a refrigerant circuit in which carbon dioxide is used as a refrigerant and which has a supercritical pressure on a high pressure side; and a cascade heat exchanger which performs heat exchange between the fluid flowing from the heat source to the heat exchanger for heating in the waste heat utilization circuit and the refrigerant of the refrigerant circuit, the refrigerant circuit including a compressor, the cascade heat exchanger, a flow divider, an auxiliary pressure reduction unit, an internal heat exchanger, a main pressure reduction unit and a heat absorber disposed externally from the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, the other divided refrigerant being passed from the main pressure reduction unit to the heat absorber and being then sucked into a low pressure section of the compressor, the compressor including low stage side compression means and high stage side compression means, the refrigerant discharged from the heat absorber or the heat exchanger for cooling being sucked into the low stage side compression means, an intermediate pressure refrigerant compressed by the low stage side compression means being sucked into the high stage side compression means together with one refrigerant discharged from the internal heat exchanger, the device being configured to control an open degree of the auxiliary pressure reduction unit so that a temperature of the refrigerant sucked into the high stage side compression means—a temperature of the refrigerant discharged from the low stage side compression means is a positive value and a superheat degree of the refrigerant sucked into the high stage side compression means is 2 K or more.

According to an eleventh invention, in the ninth invention or the tenth invention, the internal heat exchanger performs heat exchange between one refrigerant passed through the auxiliary pressure reduction unit and the refrigerant which has been discharged from the cascade heat exchanger and which has not been divided by the flow divider.

According to the first invention, the air conditioning device comprises the waste heat utilization circuit which circulates the fluid through the heat source and the heat exchanger for heating and in which the waste heat of the heat source is utilized in heating the room to be conditioned in the heat exchanger for heating; the refrigerant circuit in which carbon dioxide is used as the refrigerant and which has the supercritical pressure on the high pressure side; and the cascade heat exchanger which performs the heat exchange between the fluid flowing from the heat source to the heat exchanger for heating in the waste heat utilization circuit and the refrigerant of the refrigerant circuit. The refrigerant circuit includes the compressor, the cascade heat exchanger, the flow divider, the auxiliary pressure reduction unit, the internal heat exchanger, the main pressure reduction unit and the heat absorber disposed externally from the room to be conditioned. The refrigerant discharged from the compressor is passed through the cascade heat exchanger. Moreover, the refrigerant discharged from the cascade heat exchanger is divided by the flow divider. One divided refrigerant is passed from the auxiliary pressure reduction unit to the internal heat exchanger to perform the heat exchange between the refrigerant and the refrigerant discharged from the cascade heat exchanger and then sucked into the intermediate pressure section of the compressor. The other divided refrigerant is passed from the main pressure reduction unit to the heat absorber, and then sucked into the low pressure section of the compressor. Therefore, when the refrigerant divided by the flow divider and heated by the internal heat exchanger is returned to the intermediate pressure section of the compressor, an amount of the refrigerant flowing through the cascade heat exchanger can be increased without increasing a circulation amount of the refrigerant flowing through the refrigerant circuit.

In consequence, the amount of the refrigerant subjected to the heat exchange between the refrigerant and the fluid in the cascade heat exchanger increases, and heat exchange capability of the cascade heat exchanger can be improved. As in the fourth invention, the internal heat exchanger performs the heat exchange between the one refrigerant passed through the auxiliary pressure reduction unit and the refrigerant which has been discharged from the cascade heat exchanger and which has not been divided by the flow divider. In consequence, specific enthalpy of the refrigerant entering the heat absorber can be reduced. Therefore, heat absorption capability of the heat absorber is improved, and heating capability can further be improved.

Furthermore, when the one refrigerant divided by the flow divider is returned to the intermediate pressure section of the compressor, an amount of the refrigerant to be compressed by the low pressure section of the compressor can be reduced. Therefore, a compression power of the compressor can be lowered, and operation efficiency of the compressor can be improved.

Therefore, efficiency and performance of the air conditioning device using the carbon dioxide refrigerant can be improved.

According to the second invention, the air conditioning device comprises the waste heat utilization circuit which circulates the fluid through the heat source and the heat exchanger for heating and in which the waste heat of the heat source is utilized in heating the room to be conditioned in the heat exchanger for heating; the refrigerant circuit in which carbon dioxide is used as the refrigerant and which has the supercritical pressure on the high pressure side; and the cascade heat exchanger which performs the heat exchange between the fluid flowing from the heat source to the heat exchanger for heating in the waste heat utilization circuit and the refrigerant of the refrigerant circuit. The refrigerant circuit including the compressor, the cascade heat exchanger, the flow divider, the auxiliary pressure reduction unit, the internal heat exchanger, the main pressure reduction unit and the heat exchanger for cooling which cools the main pressure reduction unit and the room to be conditioned. The refrigerant discharged from the compressor is passed through the cascade heat exchanger. Moreover, the refrigerant discharged from the cascade heat exchanger is divided by the flow divider. The one divided refrigerant is passed from the auxiliary pressure reduction unit to the internal heat exchanger to perform the heat exchange between the refrigerant and the refrigerant discharged from the cascade heat exchanger and then sucked into the intermediate pressure section of the compressor. The other divided refrigerant is passed from the main pressure reduction unit to the heat exchanger for cooling and then sucked into the low pressure section of the compressor. Therefore, when the refrigerant divided by the flow divider and heated by the internal heat exchanger is returned to the intermediate pressure section of the compressor, the amount of the refrigerant discharged from the compressor can be increased without increasing the circulation amount of the refrigerant flowing through the refrigerant circuit.

Therefore, since radiation capability of the refrigerant is improved, specific enthalpy of the refrigerant entering the heat exchanger for cooling decreases, and refrigeration effect can be improved. Furthermore, as in the fourth invention, the internal heat exchanger performs the heat exchange between the one refrigerant passed through the auxiliary pressure reduction unit and the refrigerant which has been discharged from the cascade heat exchanger and which has not been divided by the flow divider. In consequence, the ratio enthalpy of the refrigerant entering the heat absorber can further be reduced, and freezing effect can further be improved.

Furthermore, when the one refrigerant divided by the flow divider is returned to the intermediate pressure section of the compressor, the amount of the refrigerant to be compressed by the low pressure section of the compressor can be reduced. Therefore, the compression power of the compressor can be lowered, and the operation efficiency of the compressor can be improved.

Therefore, the efficiency and performance of the air conditioning device using the carbon dioxide refrigerant can be improved.

According to the third invention, the air conditioning device comprises the waste heat utilization circuit which circulates the fluid through the heat source and the heat exchanger for heating and in which the waste heat of the heat source is utilized in heating the room to be conditioned in the heat exchanger for heating; the refrigerant circuit in which carbon dioxide is used as the refrigerant and which has the supercritical pressure on the high pressure side; and the cascade heat exchanger which performs the heat exchange between the fluid flowing from the heat source to the heat exchanger for heating in the waste heat utilization circuit and the refrigerant of the refrigerant circuit. The refrigerant circuit includes the compressor, the cascade heat exchanger, the flow divider, the auxiliary pressure reduction unit, the internal heat exchanger, the main pressure reduction unit, the heat absorber disposed externally from the room to be conditioned and the heat exchanger for cooling which cools the room to be conditioned. The refrigerant discharged from the compressor is passed through the cascade heat exchanger, and the refrigerant discharged from the cascade heat exchanger is divided by the flow divider. The one divided refrigerant is passed from the auxiliary pressure reduction unit to the internal heat exchanger to perform the heat exchange between the refrigerant and the refrigerant discharged from the cascade heat exchanger, and then sucked into the intermediate pressure section of the compressor. Moreover, during the heating, the other divided refrigerant is passed from the main pressure reduction unit to the heat absorber, and then sucked into the low pressure section of the compressor. During the cooling, the other divided refrigerant is passed from the main pressure reduction unit to the heat exchanger for cooling, and then sucked into the low pressure section of the compressor. Therefore, when the refrigerant divided by the flow divider and heated by the internal heat exchanger is returned to the intermediate pressure section of the compressor, the amount of the refrigerant flowing through the cascade heat exchanger can be increased without increasing the circulation amount of the refrigerant flowing through the refrigerant circuit.

In consequence, the amount of the refrigerant in the heat exchange between the refrigerant and the fluid in the cascade heat exchanger increases, and the heat exchange capability of the cascade heat exchanger can be improved. When the one refrigerant divided by the flow divider is returned to the intermediate pressure section of the compressor, the amount of the refrigerant to be compressed by the low pressure section of the compressor can be reduced. Therefore, the compression power of the compressor can be reduced, and the operation efficiency of the compressor can be improved.

Furthermore, as in the fourth invention, the internal heat exchanger performs the heat exchange between the one refrigerant passed through the auxiliary pressure reduction unit and the refrigerant which has been discharged from the cascade heat exchanger and which has not been divided by the flow divider. In consequence, the specific enthalpy of the refrigerant entering the heat absorber can be reduced during a heating operation. Therefore, the heat absorption capability of the heat absorber is improved, and the heating capability can further be improved.

On the other hand, during the cooling operation, the specific enthalpy of the refrigerant entering the heat exchanger for cooling can further be reduced, and the freezing effect can further be improved.

As described above in detail, according to the present invention, the efficiency and the performance of the air conditioning device using the carbon dioxide refrigerant can be improved.

According to the fifth invention, in the above inventions, the one refrigerant is divided from the upper part and the lower part of the flow divider. Therefore, an oil discharged from the compressor to the refrigerant circuit in the flow divider can securely be returned to the intermediate pressure section of the compressor together with the one refrigerant.

Moreover, according to the sixth invention, in the above inventions, the compressor includes the low stage side compression means and the high stage side compression means, the refrigerant discharged from the heat absorber or the heat exchanger for cooling is sucked into the low stage side compression means, the intermediate pressure refrigerant compressed by this low stage side compression means is sucked into the high stage side compression means together with the one refrigerant discharged from the internal heat exchanger, and the ratio of the displacement capacity of the high stage side compression means to that of the low stage side compression means is set to 70% or more and 85% or less. In consequence, the best efficiency can be maintained.

Furthermore, according to the seventh invention, when the air conditioning device includes the temperature detection means for detecting the temperature of the refrigerant entering the main pressure reduction unit, and the device controls the open degree of the auxiliary pressure reduction unit so that the temperature detected by this temperature detection means indicates the minimum value. In consequence, the efficiency of the air conditioning device can further be improved.

In addition, according to the eighth invention, the device includes the temperature detection means for detecting the temperature of the refrigerant of the intermediate pressure section of the compressor, and the device controls the open degree of the auxiliary pressure reduction unit so that the temperature detected by this temperature detection means indicates the maximum value. In consequence, the efficiency of the air conditioning device can further be improved.

According to the ninth invention, the air conditioning device comprises the waste heat utilization circuit which circulates the fluid through the heat source and the heat exchanger for heating and in which the waste heat of the heat source is utilized in heating the room to be conditioned in the heat exchanger for heating; the refrigerant circuit in which carbon dioxide is used as the refrigerant and which has the supercritical pressure on the high pressure side; and the cascade heat exchanger which performs the heat exchange between the fluid flowing from the heat source to the heat exchanger for heating in the waste heat utilization circuit and the refrigerant of the refrigerant circuit. The refrigerant circuit includes the compressor, the cascade heat exchanger, the flow divider, the auxiliary pressure reduction unit, the internal heat exchanger, the main pressure reduction unit and the heat absorber disposed externally from the room to be conditioned. The refrigerant discharged from the compressor is passed through the cascade heat exchanger, and the refrigerant discharged from the cascade heat exchanger is divided by the flow divider. The one divided refrigerant is passed from the auxiliary pressure reduction unit to the internal heat exchanger to perform the heat exchange between the refrigerant and the refrigerant discharged from the cascade heat exchanger, and then sucked into the intermediate pressure section of the compressor. The other divided refrigerant is passed from the main pressure reduction unit to the heat absorber, and then sucked into the low pressure section of the compressor. Moreover, the device is configured to control the open degree of the auxiliary pressure reduction unit so that the temperature of the one refrigerant discharged from the internal heat exchanger minus the temperature of the one refrigerant entering the internal heat exchanger is 20 K or less and the superheat degree of the refrigerant of the intermediate pressure section of the compressor is 2 K or more. Therefore, when the refrigerant divided by the flow divider and heated by the internal heat exchanger is returned to the intermediate pressure section of the compressor, the amount of the refrigerant flowing through the cascade heat exchanger can be increased without increasing the circulation amount of the refrigerant flowing through the refrigerant circuit. In consequence, the amount of the refrigerant for the heat exchange between the refrigerant and the fluid in the cascade heat exchanger increases, and the improvement of the heat exchange capability of the cascade heat exchanger can be achieved.

Especially, the open degree of the auxiliary pressure reduction unit is controlled so that the temperature of the one refrigerant discharged from the internal heat exchanger minus the one refrigerant entering the internal heat exchanger is 20 K or less and the superheat degree of the refrigerant of the intermediate pressure section of the compressor is 2 K or more. In consequence, the amount of the refrigerant returned to the intermediate pressure section of the compressor can be increased, and a disadvantage of refrigerant liquid backflow can be eliminated.

In consequence, while reliability of the compressor is secured, the heating capability can be improved.

According to the tenth invention, the air conditioning device comprises the waste heat utilization circuit which circulates the fluid through the heat source and the heat exchanger for heating and in which the waste heat of the heat source is utilized in heating the room to be conditioned in the heat exchanger for heating; the refrigerant circuit in which carbon dioxide is used as the refrigerant and which has the supercritical pressure on the high pressure side; and the cascade heat exchanger which performs the heat exchange between the fluid flowing from the heat source to the heat exchanger for heating in the waste heat utilization circuit and the refrigerant of the refrigerant circuit. The refrigerant circuit includes the compressor, the cascade heat exchanger, the flow divider, the auxiliary pressure reduction unit, the internal heat exchanger, the main pressure reduction unit and the heat absorber disposed externally from the room to be conditioned. The refrigerant discharged from the compressor is passed through the cascade heat exchanger. The refrigerant discharged from the cascade heat exchanger is divided by the flow divider. The one divided refrigerant is passed from the auxiliary pressure reduction unit to the internal heat exchanger to perform the heat exchange between the refrigerant and the refrigerant discharged from the cascade heat exchanger, and then sucked into the intermediate pressure section of the compressor. The other divided refrigerant is passed from the main pressure reduction unit to the heat absorber, and then sucked into the low pressure section of the compressor. Moreover, the compressor includes the low stage side compression means and the high stage side compression means. The refrigerant discharged from the heat absorber or the heat exchanger for cooling is sucked into the low stage side compression means. The intermediate pressure refrigerant compressed by the low stage side compression means is sucked into the high stage side compression means together with the one refrigerant discharged from the internal heat exchanger. Moreover, the temperature of the refrigerant sucked into the high stage side compression means—the temperature of the refrigerant discharged from the low stage side compression means is a positive value. The device is configured to control the open degree of the auxiliary pressure reduction unit so that the superheat degree of the refrigerant sucked into the high stage side compression means is 2 K or more. When the refrigerant divided by the flow divider and heated by the internal heat exchanger is returned to the intermediate pressure section of the compressor, the amount of the refrigerant flowing through the cascade heat exchanger can be increased without increasing the circulation amount of the refrigerant flowing through the refrigerant circuit. In consequence, the amount of the refrigerant for the heat exchange between the refrigerant and the fluid in the cascade heat exchanger increases, and the improvement of the heat exchange capability of the cascade heat exchanger can be achieved.

Especially, the open degree of the auxiliary pressure reduction unit is controlled so that the temperature of the refrigerant sucked into the high stage side compression means minus the temperature of the refrigerant discharged from the low stage side compression means is the positive value and the superheat degree of the refrigerant sucked into the high stage side compression means is 2 K or more. In consequence, the amount of the refrigerant returned to the intermediate pressure section of the compressor can be increased, and the disadvantage of the refrigerant liquid backflow can be eliminated.

According to the air conditioning device of the eleventh invention, in the ninth invention or the tenth invention, the internal heat exchanger performs the heat exchange between the one refrigerant passed through the auxiliary pressure reduction unit and the refrigerant which has been discharged from the cascade heat exchanger and which has not been divided by the flow divider. In consequence, during the heating operation, the specific enthalpy of the refrigerant entering the heat absorber can be reduced. Therefore, the heat absorption capability of the heat absorber can be improved, and the heating capability can further be improved.

As described above in detail, according to the present invention, the performance of the air conditioning device using the carbon dioxide refrigerant can be improved.

BRIEF DESCRIPTION OF THE DRAWINGS

FIG. 5 is a diagram showing operations of an expansion valve and an electromagnetic valve of the refrigerant circuit of FIG. 4;

DETAILED DESCRIPTION OF THE PREFERRED EMBODIMENT

An embodiment of an air conditioning device of the present invention will hereinafter be described in detail with reference to the drawings.

Figure 1:
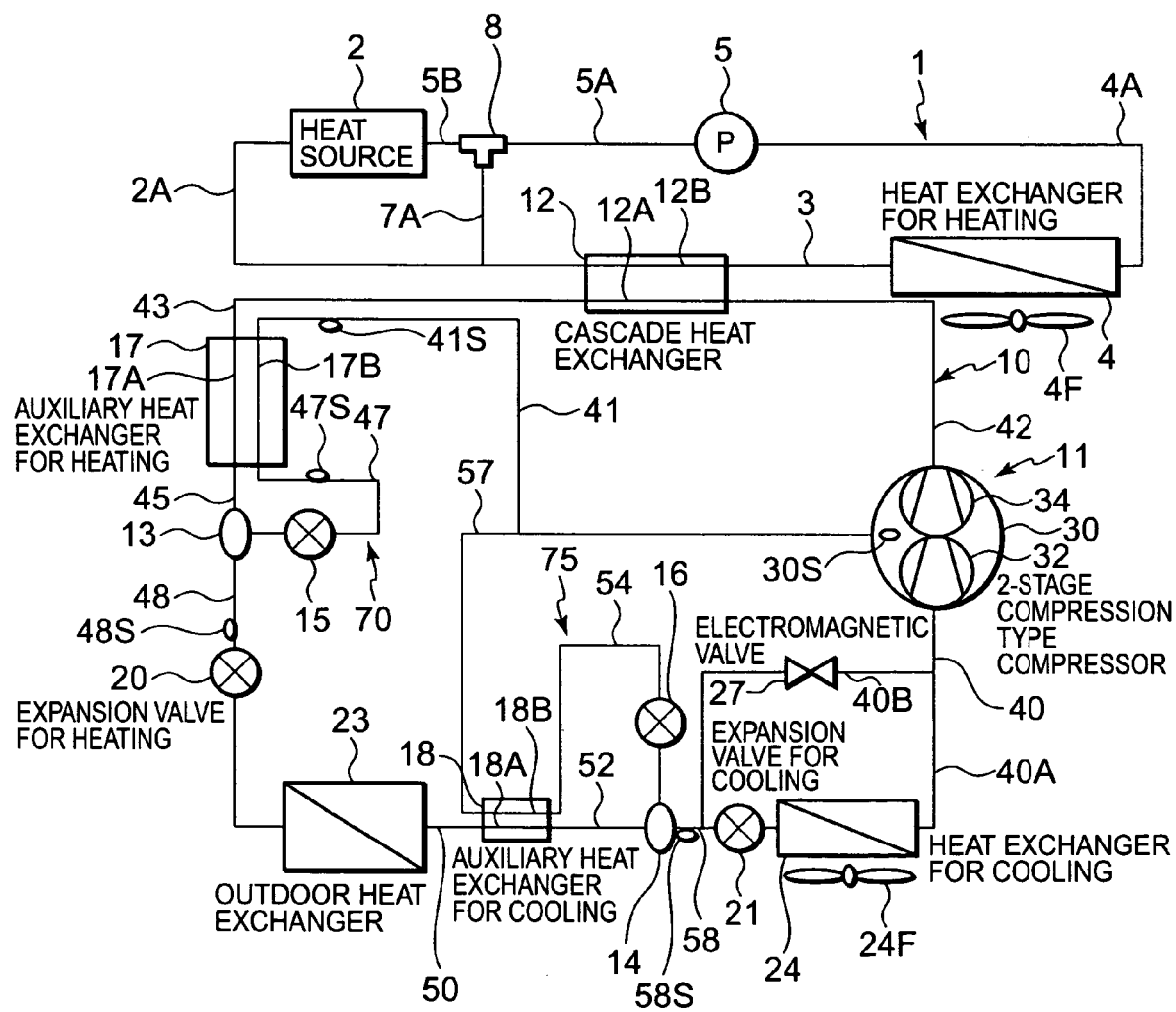
FIG. 1 is a schematic diagram of an air conditioning device according to one embodiment of the present invention.

FIG. 1 is a schematic diagram of the air conditioning device according to one embodiment of the present invention. The air conditioning device of the present embodiment is used as a car air conditioner. The device is constituted of a waste heat utilization circuit 1, a refrigerant circuit 10 and a cascade heat exchanger 12 for performing heat exchange between a fluid flowing through the waste heat utilization circuit 1 and a refrigerant flowing through the refrigerant circuit 10. The waste heat utilization circuit 1 utilizes waste heat of a heat source 2 of an engine such as HEV or FCV in heating a car chamber which is a room to be conditioned. The circuit is constituted by connecting the heat source 2 and a heat exchanger 4 for heating in an annular form via a pipe. The circuit is constituted so that a fluid flowing through the pipe is circulated by a circulation pump 5.

That is, a pipe 2A connected to an outlet of the heat source 2 is connected to an inlet of a passage 12B of the cascade heat exchanger 12, and a pipe 3 connected to an outlet of the passage 12B is connected to an inlet of the heat exchanger 4 for heating. A pipe 4A exiting from the heat exchanger 4 for heating is connected to an inlet of the circulation pump 5, an outlet of the circulation pump 5 is connected to one end of a pipe 5A, and the other end of the pipe 5A enters an inlet of a three-way valve 8. This three-way valve 8 is channel control means for controlling whether or not to pass the fluid circulated by the circulation pump 5 through the heat source 2, and controlled by control means (not shown).

Moreover, one outlet of the three-way valve 8 is connected to an inlet of the heat source 2 of the heat source 2 via a pipe 5B, and another outlet of the valve is connected to one end of a bypass pipe 7A. The bypass pipe 7A is a pipe which allows the fluid circulated by the circulation pump 5 to flow around the heat source 2 and which successively passes the fluid through the cascade heat exchanger 12 and the heat exchanger 4 for heating. The other end of the bypass pipe 7A is connected to a middle portion of the pipe 2A positioned on an upstream side of the cascade heat exchanger 12 along the pipe 2A.

Furthermore, when the heat source 2 has a low temperature, for example, immediately after starting the heat source 2, the control means controls the three-way valve 8 so that the fluid flows from the pipe 5A to the bypass pipe 7A. When the temperature of the heat source 2 rises, for example, to a predetermined temperature set beforehand, the control means controls the three-way valve 8 so that the fluid flows from the pipe 5A to the pipe 5B.

It is to be noted that in the present embodiment, the air conditioning device is used as the car air conditioner, and the heat source is an engine such as the HEV or the FCV. However, the air conditioning device of the present invention can be used as a co-generation system or the like in addition to the car air conditioner. In this case, the heat source is an FC or the like.

On the other hand, the refrigerant circuit 10 is a refrigerant circuit in which carbon dioxide is used as a refrigerant and which has a supercritical pressure on a high pressure side. The circuit is constituted of a compressor 11; the cascade heat exchanger 12; flow dividers including a flow divider 13 for heating and a flow divider 14 for cooling; auxiliary pressure reduction units including an auxiliary expansion valve 15 for heating and an auxiliary expansion valve 16 for cooling; an internal heat exchanger including an auxiliary heat exchanger 17 for heating and an auxiliary heat exchanger 18 for cooling; a main pressure reduction unit including an expansion valve 20 for heating and an expansion valve 21 for cooling; an outdoor heat exchanger 23 which is a heat absorber disposed externally from the car chamber; a heat exchanger 24 for cooling which cools the inside of the car chamber and the like.

The compressor 11 is a multistage (two-stage) compression type compressor containing, in a sealed vessel 30, a driving element (not shown), a first compression element 32 as low stage side compression means driven by a driving shaft of this driving element and a second compression element 34 as high stage side compression means. Moreover, the refrigerant discharged from the outdoor heat exchanger 23 or the heat exchanger 24 for cooling is sucked into the first compression element 32 and compressed. The refrigerant compressed by the first compression element 32 to obtain an intermediate pressure is discharged into the sealed vessel 30, then combined with one refrigerant discharged from the auxiliary heat exchanger 17 for heating of an auxiliary circuit 70 for heating or the auxiliary heat exchanger 18 for cooling of an auxiliary circuit 75 for cooling as described later, sucked into the second compression element 34 and compressed. In the present embodiment, it is assumed that in the compressor 11 for use, a ratio of a displacement capacity of the second compression element 34 to that of the first compression element 32 is 70% or more and 85% or less.

One end of a refrigerant introduction tube 40 is connected to the first compression element 32 on a suction side. A low-temperature low-pressure refrigerant gas is introduced from this end to the first compression element 32 constituting the low stage side compression means. The other end of the refrigerant introduction tube 40 is divided into two pipes. One pipe 40A is connected to an outlet of the heat exchanger 24 for cooling, and the other pipe 40B is connected to a middle portion of a refrigerant pipe 58 connected to the other outlet of the flow divider 14 for cooling via an electromagnetic valve 27.

Moreover, the second compression element 34 on a discharge side is connected to one end of a refrigerant discharge tube 42, and a high-temperature high-pressure refrigerant gas compressed by the second compression element 34 on a high stage side is discharged from the compressor 11 via the refrigerant discharge tube 42. The refrigerant discharge tube 42 is connected to a passage 12A of the cascade heat exchanger 12. The cascade heat exchanger 12 performs heat exchange between the high-temperature high-pressure refrigerant gas exiting from the compressor 11 and flowing through the refrigerant circuit 10 and the fluid flowing through the waste heat utilization circuit 1. The exchanger is provided with the passages 12A and 12B so that the heat exchange can be performed. Moreover, the high-temperature high-pressure refrigerant gas discharged from the compressor 11 flows through the passage 12A of the cascade heat exchanger 12, and the fluid of the waste heat utilization circuit 1 flows through the passage 12B. At one end of the cascade heat exchanger 12, an inlet of the passage 12A and an outlet of the passage 12B are formed, respectively. At the other end of the exchanger, an outlet of the passage 12A and the outlet of the passage 12B are formed, respectively. Therefore, in the cascade heat exchanger 12, there are counter flows of the refrigerant flowing of the refrigerant circuit 10 flowing through the passage 12A and the fluid of the waste heat utilization circuit 1 flowing through the passage 12B.

On the other hand, a refrigerant pipe 43 exiting from the passage 12A of the cascade heat exchanger 12 is connected to an inlet of a passage 17A of the auxiliary heat exchanger 17 for heating. The auxiliary heat exchanger 17 for heating performs heat exchange between the refrigerant discharged from the cascade heat exchanger 12 during a heating operation described later and the refrigerant (one refrigerant divided by the flow divider 13 for heating) divided by the flow divider 13 for heating and having the pressure reduced by the auxiliary expansion valve 15 for heating disposed in the auxiliary circuit 70 for heating. The auxiliary heat exchanger is provided with the passage 17A and a passage 17B so that the heat exchange can be performed. Moreover, during the heating operation, the refrigerant discharged from the cascade heat exchanger 12 flows through the passage 17A of the auxiliary heat exchanger 17 for heating. The refrigerant divided by the flow divider 13 for heating, entering the auxiliary circuit 70 for heating and having the pressure reduced by the auxiliary expansion valve 15 for heating flows through the passage 17B. One end of the auxiliary heat exchanger 17 for heating is provided with the inlet of the passage 17A and an outlet of the passage 17B, and the other end of the heat exchanger is provided with an outlet of the passage 17A and the outlet of the passage 17B so that the refrigerant flowing through the passage 17A and the refrigerant flowing through the passage 17B form counter flows in the auxiliary heat exchanger 17 for heating.

A refrigerant pipe 45 connected to the outlet of the passage 17A of the auxiliary heat exchanger 17 for heating is connected to an inlet of the flow divider 13 for heating. The flow divider 13 for heating is refrigerant branching means for dividing the refrigerant discharged from the auxiliary heat exchanger 17 for heating into two refrigerant flows including a first refrigerant flow (one refrigerant) and a second refrigerant flow (the other refrigerant) during the heating operation. One outlet of the flow divider 13 for heating is connected to a refrigerant pipe 47 of the auxiliary heating circuit 70 for the first refrigerant flow (the one refrigerant). The other outlet of the flow divider 13 for heating is connected to a refrigerant pipe 48 for the second refrigerant flow (the other refrigerant).

The auxiliary circuit 70 for heating is a circuit which reduces the pressure of the one refrigerant divided by the flow divider 13 for heating to expand the refrigerant. Subsequently, the refrigerant is sucked into the sealed vessel 30 which is an intermediate pressure section of the compressor 11. The auxiliary circuit 70 for heating is provided with the auxiliary expansion valve 15 for heating which reduces the pressure of the one refrigerant divided by the flow divider 13 for heating. That is, the refrigerant pipe 47 connected to one outlet of the flow divider 13 for heating is connected to an inlet of the auxiliary expansion valve 15 for heating. Moreover, an outlet of the auxiliary expansion valve 15 for heating is connected to an inlet of the passage 17B of the auxiliary heat exchanger 17 for heating. In consequence, the refrigerant having the pressure-reduced by the auxiliary expansion valve 15 for heating is passed through the auxiliary heat exchanger 17 for heating to perform the heat exchange between the refrigerant and the refrigerant discharged from the cascade heat exchanger 12 on the high pressure side. The refrigerant flowing through the passage 17B can then be expanded. The outlet of the passage 17B is connected to a refrigerant introduction tube 41. The one refrigerant divided by the flow divider 13 for heating is sucked into the sealed vessel 30 as the intermediate pressure section of the compressor 11 via the tube.

Figure 2:
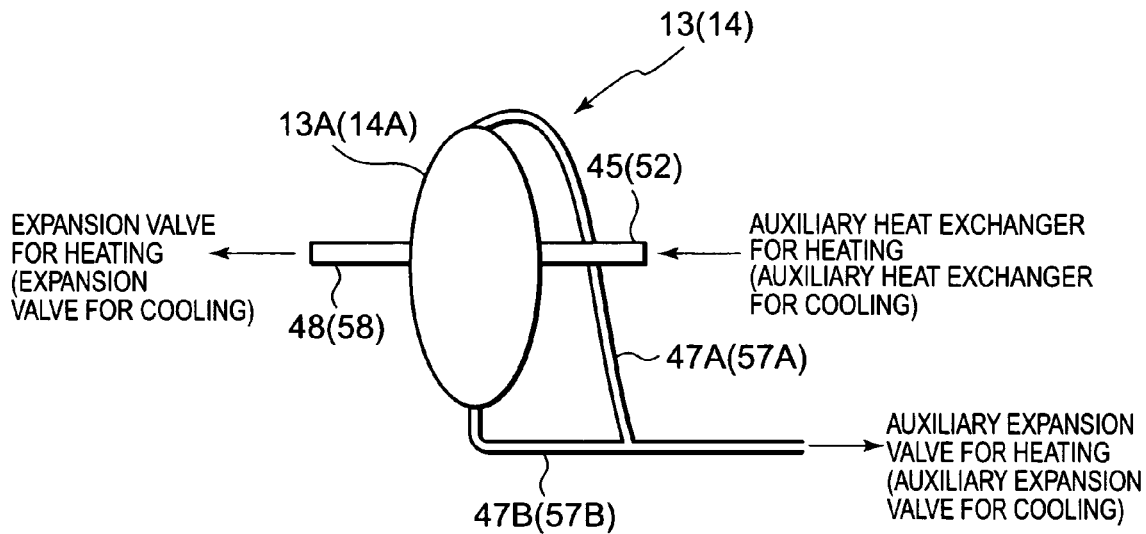
FIG. 2 is a diagram showing a structure of a flow divider of a refrigerant circuit in the air conditioning device of FIG. 1.

Here, the flow divider 13 for heating for use in the present embodiment will be described with reference to FIG. 2. In FIG. 2, reference numeral 13A is a main body of the flow divider 13 for heating. The main body 13A is provided with an inlet on one side (the right side of FIG. 2). The inlet is connected to the refrigerant pipe 45 exiting from the auxiliary heat exchanger 17 for heating. The other output is formed on the other side (the left side of FIG. 2) of the main body 13A, that is, along a diagonal line of the inlet connected to the refrigerant pipe 45. This outlet is connected to the refrigerant pipe 48 extending to the expansion valve 20 for heating. One outlet is formed in each of upper and lower parts of the main body 13A, the one outlet formed in the upper part is connected to one end of a refrigerant pipe 47A, and the one outlet formed in the lower part is connected to one end of a refrigerant pipe 47B. The other end of the refrigerant pipe 47A connected to the upper part is connected to a middle portion of the refrigerant pipe 47B connected to the lower part, and the other end of the refrigerant pipe 47B is connected to the inlet of the auxiliary expansion valve 15 for heating. In consequence, the one refrigerant can be divided from the upper and lower parts of the flow divider 13 for heating, and passed through the auxiliary circuit 70 for heating.

Figure 3:
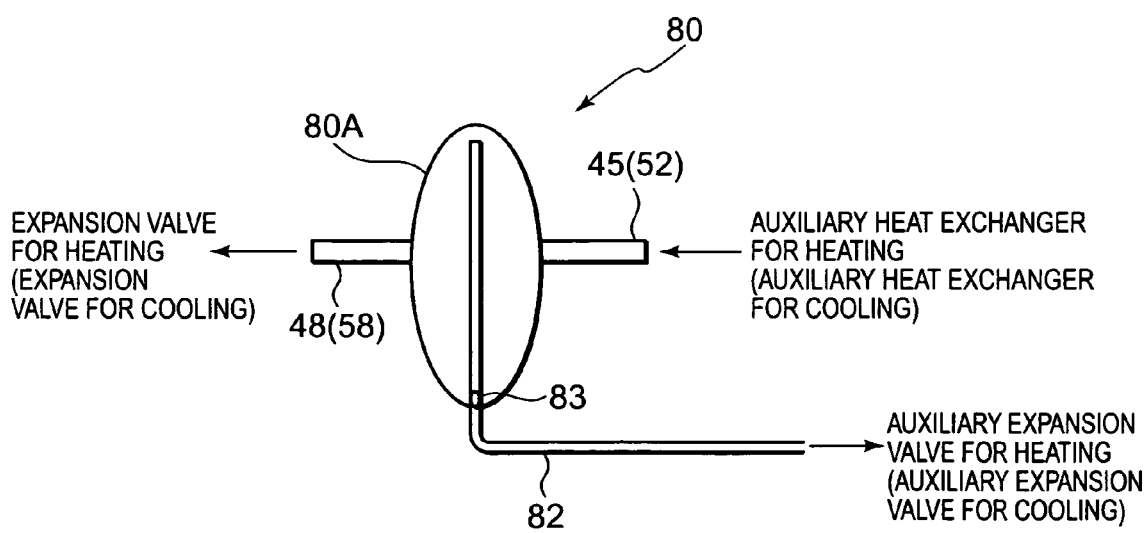
FIG. 3 is a diagram showing a structure of another flow divider.

It is to be noted that a structure of the flow divider 13 for heating is not limited to the structure described with reference to FIG. 2, and any structure may be constituted as long as the refrigerant discharged from the cascade heat exchanger 12 can be divided into two refrigerant flows. According to the fifth invention, any structure may be constituted as long as the one refrigerant can be divided from the upper and lower parts of the flow divider. For example, a flow divider having a structure shown in FIG. 3 may be used. In a flow divider 80 of FIG. 3, an inlet is formed in a main body 80A on one side (the right side of FIG. 3) in the same manner as in the flow divider described with reference to FIG. 2. The inlet is connected to the refrigerant pipe 45 exiting from the auxiliary heat exchanger 17 for heating. Similarly, the other outlet is formed on the other side (the left side of FIG. 3) of the main body 80A, that is, along a diagonal line of the inlet connected to the refrigerant pipe 45. The outlet is connected to the refrigerant pipe 48 extending to the expansion valve 20 for heating. In the lower part of the main body 80A, one outlet is formed. The one outlet is connected to a refrigerant pipe 82 extending to the auxiliary expansion valve 15 for heating. This refrigerant pipe 82 is inserted into the main body 80A, and one end of the pipe opens in an upper part of the main body 80A. From this end, the refrigerant in the upper part of the main body 80A of the flow divider 80 can enter the refrigerant pipe 82. A lower portion of the refrigerant pipe 82 in the main body 80A is provided with a connection port 83 which connects the inside of the refrigerant pipe 82 to the lower part of the main body 80A. The refrigerant can be passed from the lower part of the main body 80A of the flow divider 80 to the refrigerant pipe 82 via the connection port 83. Even when the flow divider 80 of FIG. 3 is used in this manner, the one refrigerant can be divided from the upper and lower parts of the flow divider 80, and passed through the auxiliary circuit 70 for heating.

On the other hand, the refrigerant pipe 48 connected to the other outlet of the flow divider 13 for heating extends to the expansion valve 20 for heating. The expansion valve 20 for heating is a main pressure reduction unit which reduces the pressure of the other refrigerant divided by the flow divider 13 for heating during the heating operation. The outdoor heat exchanger 23 is disposed on an outlet side of the expansion valve 20 for heating. The outdoor heat exchanger 23 functions as a heat absorber during the heating operation. That is, during the heating operation, the outdoor heat exchanger 23 performs the heat exchange between the refrigerant having the pressure reduced by the expansion valve 20 for heating as the main pressure reduction unit and outside air to thereby take heat from the outside air (absorb the heat). The outdoor heat exchanger 23 is used as a radiator which radiates heat to the outside air during a cooling operation or a drying operation described later.

A refrigerant pipe 50 exiting from the outdoor heat exchanger 23 is connected to an inlet of a passage 18A of the auxiliary heat exchanger 18 for cooling. The auxiliary heat exchanger 18 for cooling performs heat exchange between the refrigerant discharged from the cascade heat exchanger 12 during the cooling operation described later and the refrigerant (the one refrigerant divided by the flow divider 14 for cooling) divided by the flow divider 14 for cooling and having the pressure reduced by the auxiliary expansion valve 16 for cooling disposed in the auxiliary circuit 75 for cooling. The passage 18A and a passage 18B are arranged so that the heat exchange can be performed. Moreover, during the cooling operation, the refrigerant discharged from the cascade heat exchanger 12 flows through the passage 18A of the auxiliary heat exchanger 18 for cooling. The refrigerant divided by the flow divider 14 for cooling, entering the auxiliary circuit 75 for cooling and having the pressure reduced by the auxiliary expansion valve 16 for cooling flows through the passage 18B. In the heat exchanger 18 for cooling, one end of the auxiliary heat exchanger 18 for cooling is provided with the inlet of the passage 18A and an outlet of the passage 18B, and the other end of the exchanger is provided with an outlet of the passage 18A and the outlet of the passage 18B so that the refrigerant flowing through the passage 18A and the refrigerant flowing through the passage 18B form counter flows.

A refrigerant pipe 52 connected to the outlet of the passage 18A of the auxiliary heat exchanger 18 for cooling is connected to an inlet of the flow divider 14 for cooling. The flow divider 14 for cooling is refrigerant branching means for dividing the refrigerant discharged from the auxiliary heat exchanger 18 for cooling into two refrigerant flows including a first refrigerant flow (one refrigerant) and a second refrigerant flow (the other refrigerant) during the cooling operation. One outlet of the flow divider 14 for cooling is connected to a refrigerant pipe 54 of the auxiliary cooling circuit 75 for the first refrigerant flow (the one refrigerant). The other outlet of the flow divider 14 for cooling is connected to the refrigerant pipe 58 for the second refrigerant flow (the other refrigerant).

The auxiliary circuit 75 for cooling is a circuit which reduces the pressure of the one refrigerant divided by the flow divider 14 for cooling to expand the refrigerant. Subsequently, the refrigerant is sucked into the sealed vessel 30 which is the intermediate pressure section of the compressor 11. The auxiliary circuit 75 for cooling is provided with the auxiliary expansion valve 16 for cooling which reduces the pressure of the one refrigerant divided by the flow divider 14 for cooling. That is, the refrigerant pipe 54 connected to one outlet of the flow divider 14 for cooling is connected to an inlet of the auxiliary expansion valve 16 for cooling. Moreover, an outlet of the auxiliary expansion valve 16 for cooling is connected to the inlet of the passage 18B of the auxiliary heat exchanger 18 for cooling. In consequence, during the cooling operation, the refrigerant having the pressure reduced by the auxiliary expansion valve 16 for cooling is passed through the auxiliary heat exchanger 18 for cooling to perform the heat exchange between the refrigerant and the refrigerant discharged from the cascade heat exchanger 12 on the high pressure side. The refrigerant flowing through the passage 18B can then be expanded. The outlet of the passage 18B is connected to one end of a refrigerant pipe 57. The other end of the refrigerant pipe 57 is connected to a middle portion of the refrigerant introduction tube 41 described above. The one refrigerant divided by the flow divider 14 for cooling is sucked into the sealed vessel 30 as the intermediate pressure section of the compressor 11 via the refrigerant introduction tube 41.

In the flow divider 14 for cooling, refrigerant flow divider means having a constitution similar to that of the above flow divider 13 for heating as described with reference to FIG. 2 is used, but the flow divider is not limited to this means. Any structure may be used as long as the refrigerant discharged from the cascade heat exchanger 12 can be divided into two refrigerant flows. According to the fifth invention, any structure may be used as long as the one refrigerant can be divided from the upper and lower parts. A flow divider such as the flow divider having the structure shown in FIG. 3 may be applied.

In the sealed vessel 30 of the compressor 11, a refrigerant temperature sensor 30S which detects a temperature of the refrigerant in the sealed vessel 30 is disposed. The refrigerant pipes 48 and 58 are provided with refrigerant temperature sensors 48S, 58S, respectively. The refrigerant temperature sensor 48S is refrigerant temperature detection means for detecting a temperature of the refrigerant entering the expansion valve 20 for heating (the main pressure reduction unit during the heating operation), and the refrigerant temperature sensor 58S is refrigerant temperature detection means for detecting a temperature of the refrigerant entering the expansion valve 21 for cooling (the main pressure reduction unit during the cooling operation). Furthermore, the refrigerant pipe 47 is provided with a refrigerant temperature sensor 47S which is refrigerant temperature detection means for detecting the temperature of the one refrigerant entering the auxiliary heat exchanger 17 for heating, and the refrigerant introduction tube 41 is provided with a refrigerant temperature sensor 41S which is refrigerant temperature detection means for detecting the one refrigerant discharged from the auxiliary heat exchanger 17 for heating.

The refrigerant temperature sensors 30S, 48S, 58S, 47S and 41S are connected to control means (not shown) which controls the air conditioning device of the present invention.

(1) Heating Operation Time

Figure 4:
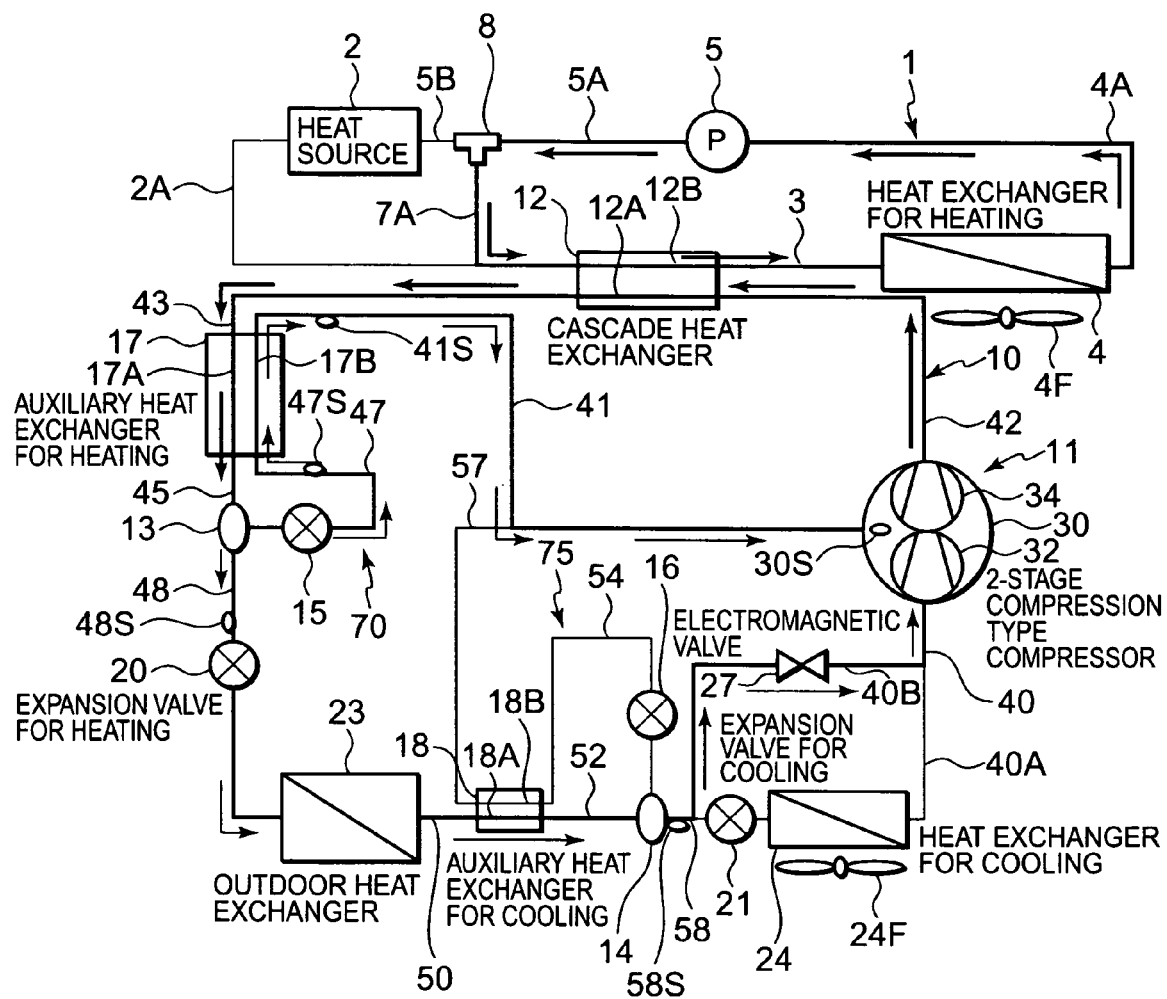
FIG. 4 is a diagram showing flows of a refrigerant and a fluid during a heating operation of the air conditioning device of FIG. 1.

Next, an operation of the air conditioning device constituted as described above will be described. First, the operation during the heating operation will be described with reference to FIG. 4 in accordance with the operation during the heating operation in a case where the heat source 2 has a low temperature, for example, at a time when the air conditioning device is started. In FIG. 4, arrows show flows of the refrigerant flowing through the refrigerant circuit 10 and the fluid flowing through the waste heat utilization circuit 1. During the heating operation, as shown in FIG. 5, the expansion valve 21 for cooling and the auxiliary expansion valve 16 for cooling are totally closed, and the electromagnetic valve 27 is totally opened. Moreover, open degrees of the auxiliary expansion valve 15 for heating and the expansion valve 20 for heating are controlled so that the pressures of the refrigerants flowing through the valves can be reduced. The control means controls the three-way valve 8 so that the fluid from the circulation pump 5 does not flow through the heat source 2, and flows through the bypass pipe 7A, thereby starting the circulation pump 5 and a fan 4F of the heat exchanger 4 for heating. In consequence, the fluid flows from the three-way valve 8 to the cascade heat exchanger 12 via the bypass pipe 7A, and flows from the other end of the exchanger to the passage 12B. While the fluid flows through the passage 12B of the cascade heat exchanger 12, heat is taken from the refrigerant flowing through the passage 12A to heat the fluid.

Moreover, the fluid discharged from one end of the cascade heat exchanger 12 enters the flow divider 14 for cooling. Here, the fluid is cooled by heat exchange between the fluid and surrounding air. On the other hand, the air heated by the heat exchange between the air and the fluid is sent into the car chamber which is the room to be conditioned. This heats the inside of the car chamber. On the other hand, the air cooled by the heat exchange in the heat exchanger 4 for heating is discharged from the heat exchanger 4 for heating, sucked into the circulation pump 5 via the pipe 4A, discharged to the pipe 5A, and flows through the passage 12B of the cascade heat exchanger 12 via the three-way valve 8 and the bypass circuit 7A. This cycle is repeated.

On the other hand, when the control means drives the driving element of the compressor 11 (at this time, a fan 24F of the heat exchanger 24 for cooling is stopped), a low-temperature low-pressure refrigerant gas is sucked from the refrigerant introduction tube 40 to a low pressure chamber side of the first compression element 32, and compressed. In consequence, the refrigerant compressed by the first compression element 32 to obtain the intermediate pressure is discharged from a high pressure chamber side into the sealed vessel 30. The refrigerant discharged into the sealed vessel 30 is combined with the first refrigerant flow (the one refrigerant divided by the flow divider 13 for heating) from the auxiliary circuit 70 for heating in the sealed vessel 30.

Subsequently, the combined refrigerants are sucked into a low pressure chamber side of the second compression element 34, and compressed to form a high-temperature high-pressure refrigerant gas. The gas enters the refrigerant discharge tube 42 from a high pressure chamber side, and is discharged from the compressor 11. At this time, the refrigerant is compressed to an appropriate supercritical pressure. The refrigerant gas discharged from the compressor 11 is mixed with an oil supplied to a sliding section of the second compression element 34 of the compressor 11.

The refrigerant discharged from the refrigerant discharge tube 42 enters the cascade heat exchanger 12 from the inlet of the passage 12A formed at one end of the cascade heat exchanger 12. Moreover, while the high-temperature high-pressure refrigerant discharged from the compressor 11 passes through the passage 12A of the cascade heat exchanger 12, heat is taken from the refrigerant by the fluid of the waste heat utilization circuit 1 flowing through the passage 12B disposed together with the passage 12A so that the heat exchange can be performed. The refrigerant is then cooled.

The refrigerant of the passage 12A cooled by the cascade heat exchanger 12 is discharged from the cascade heat exchanger 12 from the other end to enter the auxiliary heat exchanger 17 for heating from the inlet of the passage 17A formed at one end of the auxiliary heat exchanger 17 for heating. Moreover, while the refrigerant discharged from the cascade heat exchanger 12 on the high pressure side flows through the passage 17A of the auxiliary heat exchanger 17 for heating, heat is taken by the refrigerant (the one refrigerant divided by the flow divider 13 for heating and flowing through the auxiliary circuit 70 for heating) on the low pressure side flowing through the passage 17B disposed together with the passage 17A so that the heat exchange can be performed. In consequence, the high pressure side refrigerant gas flowing through the passage 17A is cooled. A specific enthalpy of the refrigerant entering the outdoor heat exchanger 23 can be reduced.

Therefore, heat absorption capability of the outdoor heat exchanger 23 is improved, and heating capability can further be improved. Especially, in a case where the high pressure refrigerant from the cascade heat exchanger 12 is cooled by the one refrigerant divided by the flow divider 13 for heating in the auxiliary heat exchanger 17 for heating, the heating capability can be improved with a compact structure and at low cost as compared with a conventional heat exchanger which performs the heat exchange between the refrigerant and the air.

The refrigerant of the passage 17A cooled by the auxiliary heat exchanger 17 for heating is discharged from the auxiliary heat exchanger 17 for heating via the other end to enter the flow divider 13 for heating. This divider divides the refrigerant into the first refrigerant flow (the one refrigerant) and the second refrigerant flow (the other refrigerant). At this time, as described above, the flow divider 13 for heating is constituted to divide one refrigerant from the upper and lower parts of the flow divider 13 for heating. Therefore, the oil can be taken out together with the one refrigerant as described later.

Moreover, the one refrigerant (the one refrigerant and the oil) divided by the flow divider 13 for heating enters the auxiliary circuit 70 for heating to reach the auxiliary expansion valve 15 for heating. It is to be noted that the refrigerant passed through the auxiliary expansion valve 15 for heating still maintains the supercritical pressure. In this state, the refrigerant flows into the auxiliary heat exchanger 17 for heating from the inlet of the passage 17B formed at the other end of the auxiliary heat exchanger 17 for heating, and the refrigerant expands. At this time, the refrigerant (the one refrigerant) flowing through the passage 17B takes heat from the refrigerant flowing through the passage 17A, and evaporates.

When the heat exchange between the refrigerant and the high pressure side refrigerant flowing through the passage 17A is performed in the auxiliary heat exchanger 17 for heating, the low pressure side refrigerant (the one refrigerant) flowing through the passage 17B can be evaporated. Moreover, the evaporated low pressure side refrigerant (including the oil) is discharged from the auxiliary heat exchanger 17 for heating via the outlet of the passage 17B formed at one end to enter the refrigerant introduction tube 41, and the refrigerant is sucked into the sealed vessel 30 of the compressor 11. Moreover, the refrigerant sucked into the sealed vessel 30 is combined with the intermediate pressure refrigerant compressed by the first compression element 32. The oil sucked together with the refrigerant into the sealed vessel 30 is separated from the refrigerant in the sealed vessel 30 to return to an oil reservoir formed at a bottom portion. In consequence, the oil discharged from the compressor 11 can be returned into the sealed vessel 30.

Figure 6:
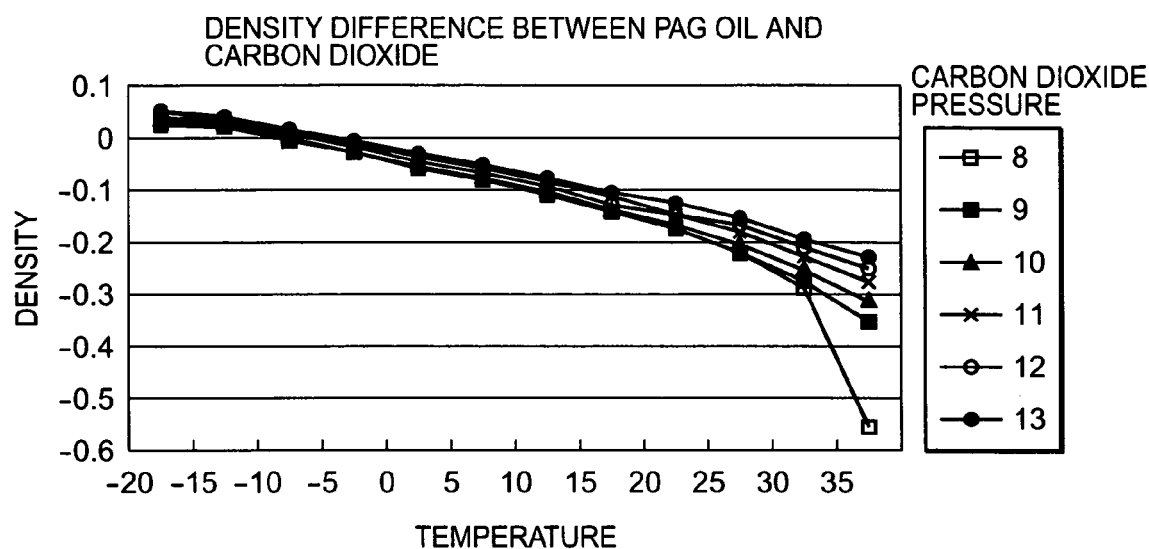
FIG. 6 is a diagram showing densities along with changes of temperatures of a carbon dioxide refrigerant and an oil (PAG)

Especially, when carbon dioxide is used as the refrigerant, a density difference between carbon dioxide and the oil increases in accordance with the pressure and the temperature of carbon dioxide. In this case, FIG. 6 shows a density difference between a PAG oil and a carbon dioxide refrigerant in a case where PAG is used as the oil. As shown in FIG. 6, it is seen that at a low temperature, the density of carbon dioxide is larger than that of the oil. The density difference decreases along with a temperature rise. At a temperature of about $-5°$ C. or more, the density of carbon dioxide becomes smaller than that of the PAG oil. Therefore, when the one refrigerant is divided from the only upper part of the flow divider 13 for heating, the PAG oil can be taken out together with the one refrigerant, and passed through the auxiliary circuit 70 for heating at a temperature of $-5°$ C. or less. However, at the temperature of $-5°$ C. or more, the density of carbon dioxide is larger than that of the PAG oil. Therefore, the oil cannot be passed together with the one refrigerant through the auxiliary circuit 70 for heating, and flows through the expansion valve 20 for heating together with the other refrigerant.

Moreover, when the one refrigerant is divided from the only lower part of the flow divider 13 for heating, the oil can be taken out together with the one refrigerant, and passed through the auxiliary circuit 70 for heating at the temperature of $-5°$ C. or more. However, at the temperature of $-5°$ C. or less, the density of carbon dioxide is smaller than that of the oil. Therefore, the oil cannot be passed together with the one refrigerant through the auxiliary circuit 70 for heating, and flows through the expansion valve 20 for heating together with the other refrigerant.

Figure 7:
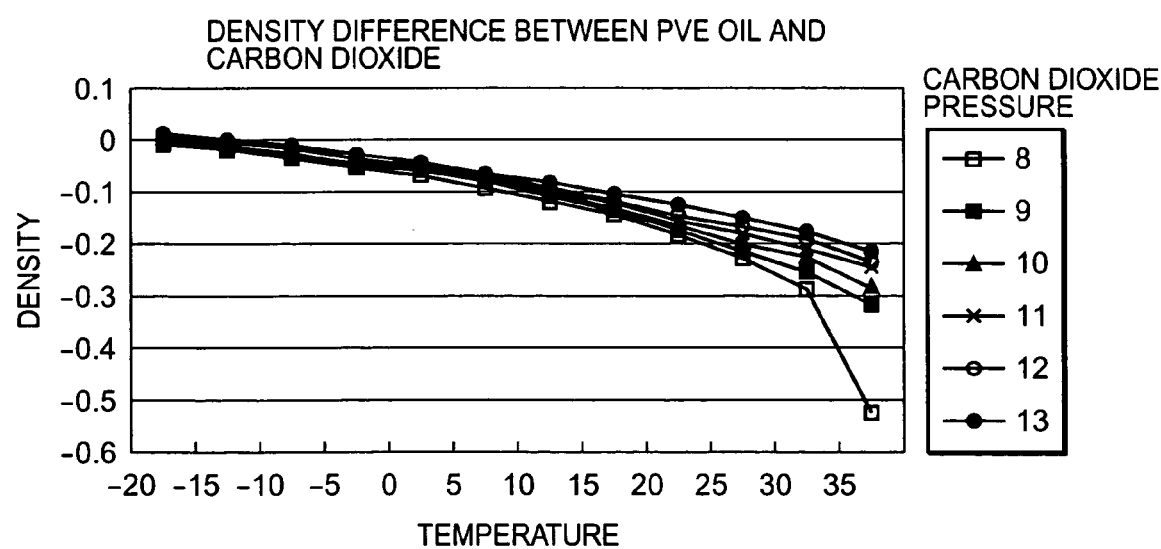
FIG. 7 is a diagram showing densities along with changes of temperatures of a carbon dioxide refrigerant and an oil (PVE)

On the other hand, FIG. 7 shows a density difference between a PVE oil and a carbon dioxide refrigerant in a case where PVE is used as the oil. As shown in FIG. 7, it is seen that at a low temperature, the density of carbon dioxide is larger than that of even the PVE oil. The density difference decreases along with a temperature rise. At a temperature of $0°$ C. or more, the density of carbon dioxide becomes smaller than that of the PVE oil. Therefore, when the one refrigerant is divided from the only upper part of the flow divider 13 for heating, the oil can be taken out together with the one refrigerant, and passed through the auxiliary circuit 70 for heating at a temperature of $0°$ C. or more. However, at the temperature of $0°$ C. or more, the density of the oil is larger than that of the carbon dioxide. Therefore, the oil cannot be passed together with the one refrigerant through the auxiliary circuit 70 for heating, and flows through the expansion valve 20 for heating together with the other refrigerant.

Moreover, when the one refrigerant is divided from the only lower part of the flow divider 13 for heating, the oil can be taken out together with the one refrigerant, and passed through the auxiliary circuit 70 for heating at the temperature of $0°$ C. or more. However, at the temperature of $0°$ C. or less, the density of the oil is smaller than that of the carbon dioxide. Therefore, the oil cannot be passed together with the one refrigerant through the auxiliary circuit 70 for heating, and flows through the expansion valve 20 for heating together with the other refrigerant.

Therefore, in the flow divider having the conventional structure, the one refrigerant is divided from the upper part or the lower part of the flow divider as described above. In consequence, it is not possible to cope with such a fluctuation of the density difference between the refrigerant and the oil. On the other hand, it has been difficult to constantly pass the oil together with the one refrigerant through the auxiliary circuit. Therefore, since the oil cannot be returned to the compressor 11 via the auxiliary circuit, the oil in the compressor 11 decreases, and oil shortage might be caused. In addition, the oil circulates through the refrigerant circuit 10 together with the other refrigerant, and the oil is accumulated in the refrigerant circuit 10. A problem occurs that a satisfactory flow of the refrigerant is hampered and a pressure loss is generated. Therefore, deterioration of performance of the whole air conditioning device might be caused.

However, even in a case where the one refrigerant is divided from the upper and lower parts of the flow divider 13 for heating as in the present invention and the density of the oil is larger or smaller than that of carbon dioxide as in the present invention, the oil can be divided from one of the upper and lower parts, passed through the auxiliary circuit 70 for heating together with the one refrigerant and securely returned into the sealed vessel 30 of the compressor 11.

That is, when the density of the oil is larger than that of carbon dioxide, the oil is accumulated in the lower part of the main body 13A. Therefore, the oil accumulated in the lower part together with the one refrigerant flow can branch from the other refrigerant, and can be passed through the auxiliary circuit 70 for heating.

Furthermore, when the density of the oil is smaller than that of carbon dioxide, the oil is accumulated in the upper part of the main body 13A. Therefore, the oil accumulated in the upper part together with the one refrigerant flow can branch from the other refrigerant, and can be passed through the auxiliary circuit 70 for heating. In consequence, in the refrigerant circuit 10 of the air conditioning device in which carbon dioxide is used as the refrigerant, the oil discharged from the compressor 11 can directly be returned into the sealed vessel 30 of the compressor 11.

In addition, when the one refrigerant divided by the flow divider 13 for heating is returned into the sealed vessel 30 as the intermediate pressure section of the compressor 11, an amount of the refrigerant sucked into the second compression element 34, compressed and flowing through the cascade heat exchanger 12 can be increased without increasing a circulation amount of the refrigerant to be passed through the refrigerant circuit 10. In consequence, an amount of the refrigerant for heat exchange between the refrigerant and the fluid in the cascade heat exchanger 12 increases, and heat exchange capability of the cascade heat exchanger 12 can be improved. Especially, when the one refrigerant divided by the flow divider 13 for heating is returned into the sealed vessel 30 as the intermediate pressure section of the compressor 11, the amount of the refrigerant to be compressed by the first compression element 32 of the compressor 11 can be reduced. Therefore, a compression power of the compressor 11 can be suppressed, and operation efficiency can be improved.

Figure 8:
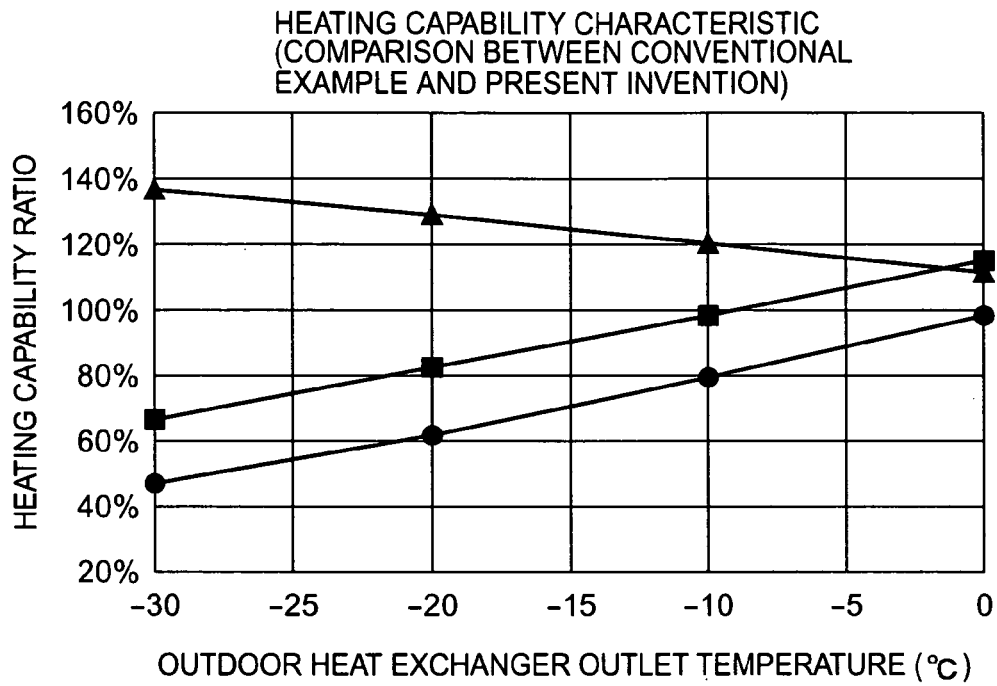
FIG. 8 is a diagram showing heating capability characteristics of an air conditioning device of the present invention and a conventional air conditioning device.

FIG. 8 shows heating capability characteristics in a case where the inside of the car chamber is heated using the refrigerant circuit 10 of the present embodiment and heating capability characteristics in a case where the inside of the car chamber is heated using a conventional refrigerant circuit. In FIG. 8, black circles show heating characteristics of a conventional air conditioning device, and black squares show heating characteristics of the air conditioning device of the present invention. Triangles show ratios (the heating characteristics of the air conditioning device of the present invention/the heating characteristics of the conventional air conditioning device) of the heating capability characteristics of the present invention to the conventional heating capability characteristics.

As apparent from FIG. 8, it is seen that when the present invention is applied, the heating capability is improved as compared with the conventional air conditioning device. Especially, as shown by triangular plots (the heating characteristics of the air conditioning device of the present invention/the heating characteristics of the conventional air conditioning device) in the drawing, when the outdoor heat exchanger 23 has a low evaporation temperature and severe conditions during the heating, a larger effect is obtained in the air conditioning device to which the present invention has been applied.

In the conventional device in which an HFC-based refrigerant is used, in a case where a so-called split type of refrigerant circuit which divides the flow of the refrigerant as in the present invention is used in the refrigerant circuit, when the circulation amount on the high pressure side increases, a high pressure side pressure increases, and the compression power also increases. Therefore, the improvement of the efficiency cannot be obtained. Therefore, it has been difficult to adopt such a refrigerant circuit. However, since the carbon dioxide refrigerant is used with the supercritical pressure on the high pressure side, the rise of the high pressure side pressure is useful for the improvement of the capability. Therefore, the efficiency is not adversely affected by the compression power increase due to the pressure increase.

As described above, according to the present invention, it is possible to improve the efficiency and the performance of the air conditioning device in which the carbon dioxide refrigerant is used and in which the supercritical pressure is achieved on the high pressure side of the refrigerant circuit 10.

On the other hand, the other refrigerant (the second refrigerant flow) divided by the flow divider 13 for heating reaches the expansion valve 20 for heating via the refrigerant pipe 48 connected to the other outlet of the flow divider 13 for heating. It is to be noted that at the inlet of the expansion valve 20 for heating, the other refrigerant discharged from the flow divider 13 for heating still has a supercritical state. While the refrigerant flows through the expansion valve 20 for heating, the pressure drops, a two-phase mixed state of a gas/a liquid is achieved, and the refrigerant enters the outdoor heat exchanger 23 in this state. In the exchanger, the refrigerant having the pressure reduced by the expansion valve 20 for heating is subjected to heat exchange between the refrigerant and surrounding outside air, and evaporates. Subsequently, the refrigerant discharged from the outdoor heat exchanger 23 flows through the auxiliary heat exchanger 18 for cooling and the flow divider 14 for cooling to enter the refrigerant introduction tube 40 via the pipe 40B connected to the middle portion of the refrigerant pipe 58, and the refrigerant is sucked into the first compression element 32 which is the low pressure section of the compressor 11. This cycle is repeated. It is to be noted that during the heating operation, the auxiliary expansion valve 16 for cooling is totally closed. Therefore, the refrigerant is not divided by the flow divider 14 for cooling, and all of the refrigerant enters the refrigerant pipe 58 connected to the other outlet. In consequence, any refrigerant does not flow through the auxiliary circuit 75 for cooling. Therefore, while the refrigerant flows through the passage 18A of the auxiliary heat exchanger 18 for cooling, the heat exchange between the refrigerants is not performed. Since the expansion valve 21 for cooling is also totally closed, all of the refrigerant entering the refrigerant pipe 58 enters the pipe 40B connected to the middle portion of the refrigerant pipe 58, and is sucked from the refrigerant introduction tube 40 into the first compression element 32 via the electromagnetic valve 27.

Figure 9:
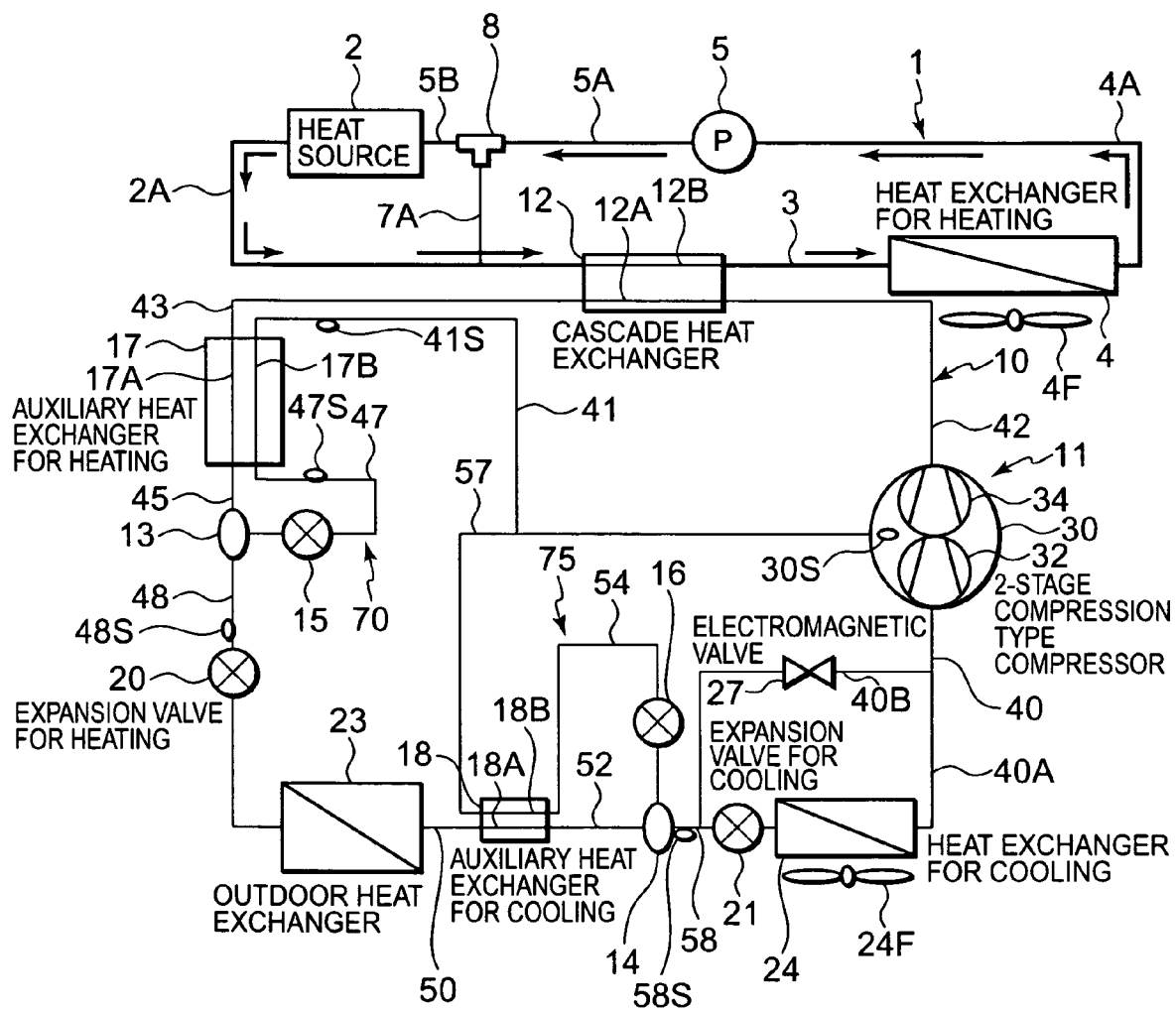
FIG. 9 is a diagram showing a flow of a fluid during a heating operation after a heat source is heated in the air conditioning device of FIG. 1.

In addition, when time elapses after the start of the heat source 2 during the heating operation and the temperature of the heat source 2 rises to, for example, a predetermined temperature set beforehand, the control means stops the operation of the compressor 11. In consequence, the heat exchange between the refrigerant and the fluid in the cascade heat exchanger 12 is not performed. The control means controls the three-way valve 8 so that the fluid flows from the pipe 5A to the pipe 5B. Therefore, as shown by arrows in FIG. 9, the fluid from the circulation pump 5 does not flow through the bypass pipe 7A, and flows through the heat source 2 via the pipe 5B. In consequence, after the fluid takes the heat of the heat source 2 and is heated, the fluid is discharged from the heat source 2 to enter the pipe 2A, and enters the heat exchanger 4 for heating via the cascade heat exchanger 12 and the pipe 3.

Here, the fluid is cooled by the heat exchange between the fluid and the surrounding air. On the other hand, the air heated by the heat exchange between the air and the fluid is sent into the car chamber which is the room to be conditioned by the fan 4F, and the car chamber is heated. On the other hand, the air cooled by the heat exchange in the heat exchanger 4 for heating is discharged from the heat exchanger 4 for heating, sucked into the circulation pump 5 via the pipe 4A, discharged to the pipe 5A, and flows through the heat source 2 via the three-way valve 8 and the pipe 5B. This cycle is repeated.

As described above, to heat the heat source 2 at the predetermined temperature set beforehand, the compressor 11 is operated to heat the inside of the car chamber by the heat from the refrigerant of the refrigerant circuit 10 by the cascade heat exchanger 12. After the heat source 2 is heated, the compressor 11 is stopped, and the inside of the car chamber is heated using the waste heat of the heat source 2. In consequence, for example, even immediately after the start of the car, the inside of the car chamber can be heated at an early stage. When the air conditioning device is mounted on the car, conformity in the car chamber can be improved. Since the inside of the car chamber is heated using the waste heat of the heat source 2 after the heating of the heat source 2, the inside of the car chamber can be heated without operating the compressor 11, and power consumption can be suppressed to the utmost to heat the inside of the car chamber.

(2) Cooling Operation Time

Figure 10:
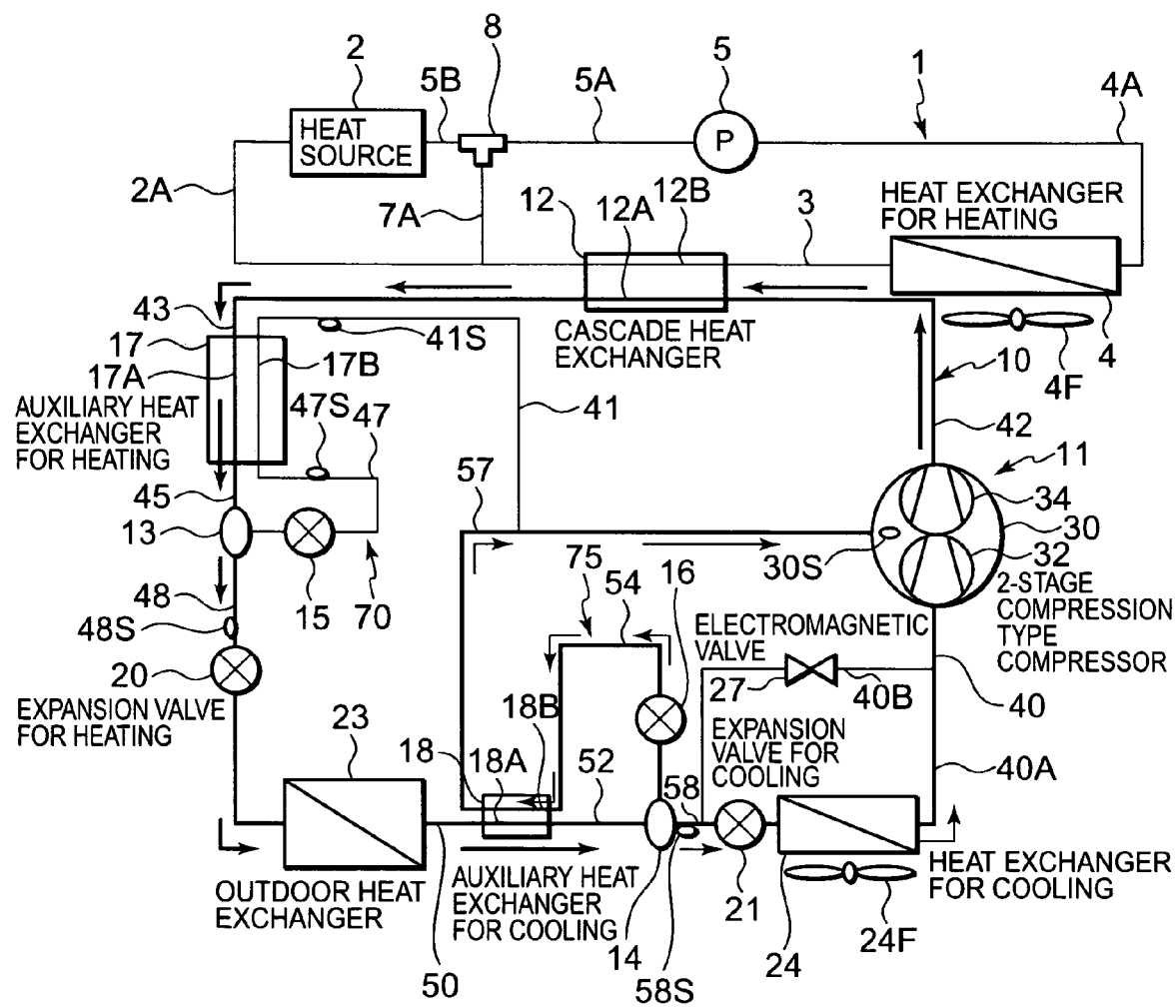
FIG. 10 is a diagram showing a flow of a refrigerant during a cooling operation in the air conditioning device of FIG. 1.

Next, an operation during the cooling operation will be described with reference to FIG. 10. In FIG. 10, arrows show flows of the refrigerant circuit 10 during the cooling operation. During the cooling operation, as shown in FIG. 5, the control means totally closes the expansion valve 20 for heating, the auxiliary expansion valve 15 for heating and the electromagnetic valve 27, and controls open degrees of the auxiliary expansion valve 16 for cooling and the expansion valve 21 for cooling so that the pressures of the refrigerants flowing through the valves can be reduced. In this case, the circulation pump 5 and the fan 4F are stopped.

Moreover, the control means starts the fan 24F of the heat exchanger 24 for cooling and the driving element of the compressor 11. In consequence, the low-temperature low-pressure refrigerant gas is sucked into the low pressure chamber side of the first compression element 32 from the refrigerant introduction tube 40, and compressed. In consequence, the refrigerant compressed by the first compression element 32 to achieve the intermediate pressure is discharged into the sealed vessel 30 from the high pressure chamber side. The refrigerant discharged into the sealed vessel 30 is combined with the first refrigerant flow (the one refrigerant divided by the flow divider 14 for cooling) from the auxiliary circuit 75 for cooling in the sealed vessel 30.

Subsequently, the combined refrigerants are sucked into the low pressure chamber side of the second compression element 34, and compressed to form a high-temperature high-pressure refrigerant gas. The gas enters the refrigerant discharge tube 42 from the high pressure chamber side, and is discharged from the compressor 11. At this time, the refrigerant is compressed to the supercritical pressure. The refrigerant gas discharged from the compressor 11 is mixed with the oil supplied to the sliding section of the second compression element 34 of the compressor 11.

Moreover, the refrigerant discharged from the refrigerant discharge tube 42 enters the outdoor heat exchanger 23 through the passage 12A of the cascade heat exchanger 12, the refrigerant pipe 43, the passage 17A of the auxiliary heat exchanger 17 for heating, the refrigerant pipe 45, the flow divider 13 for heating, the refrigerant pipe 48 and the expansion valve 20 for heating. It is to be noted that during the cooling operation, the circulation pump 5 of the waste heat utilization circuit 1 is not operated. Therefore, in the cascade heat exchanger 12, the heat exchange between the refrigerant and the fluid is not performed. As described above, the auxiliary expansion valve 15 for heating is totally closed, the refrigerant from the refrigerant pipe 45 does not flow through the auxiliary circuit 70 for heating, and all of the refrigerant flows through the refrigerant pipe 48. Therefore, in the auxiliary heat exchanger 17 for heating, the refrigerant flowing through the passage 17A does not radiate any heat, and successively flows through the refrigerant pipe 45, the flow divider 13 for heating and the refrigerant pipe 48.

Furthermore, since the expansion valve 20 for heating is totally opened during the cooling operation as described above, the pressure of the refrigerant is not reduced by the expansion valve 20 for heating, and the refrigerant enters the outdoor heat exchanger 23. The refrigerant entering the outdoor heat exchanger 23 is subjected to the heat exchange between the refrigerant and the outside air in the exchanger. Subsequently, the refrigerant is discharged from the outdoor heat exchanger 23 to enter the auxiliary heat exchanger 18 for cooling from the inlet of the passage 18A formed at one end side of the auxiliary heat exchanger 18 for cooling. In the auxiliary heat exchanger 18 for cooling, the heat of the high pressure side refrigerant flowing through the passage 18A is taken by the low pressure side refrigerant (the one refrigerant divided by the flow divider 14 for cooling and flowing through the auxiliary circuit 75 for cooling) flowing through the passage 18B disposed so that the heat exchange between the passage and the passage 18A is performed.

On the other hand, the refrigerant of the passage 18A cooled by the auxiliary heat exchanger 18 for cooling is discharged from the auxiliary heat exchanger 18 for cooling via the other end to enter the flow divider 14 for cooling. In the divider, the refrigerant is divided into the first refrigerant flow (the one refrigerant) and the second refrigerant flow (the other refrigerant). At this time, the flow divider 14 for cooling is constituted so that the one refrigerant branches from the upper and lower part of the flow divider 14. Therefore, the oil can be taken together with the one refrigerant, and passed through the auxiliary circuit 75 for cooling.

Moreover, the one refrigerant (the one refrigerant and the oil) divided by the flow divider 14 for cooling enters the auxiliary circuit 75 for cooling to reach the auxiliary expansion valve 16 for cooling. It is to be noted that the one refrigerant passed through the auxiliary expansion valve 16 for cooling still has a supercritical state. In this state, the refrigerant enters the auxiliary heat exchanger 18 for cooling from the inlet of the passage 18B formed at the other end of the auxiliary heat exchanger 18 for cooling, and is expanded. At this time, the refrigerant (the one refrigerant) flowing through the passage 18B takes heat from the refrigerant flowing through the passage 18A to evaporate.

As described above, the low pressure side refrigerant (the one refrigerant) flowing through the passage 18B can be evaporated by performing the heat exchange between the refrigerant and the high pressure side refrigerant flowing through the passage 18A of the auxiliary heat exchanger 18 for cooling. Moreover, the evaporated low pressure side refrigerant (including the oil) is discharged from the auxiliary heat exchanger 18 for cooling via the outlet of the passage 18B formed at one end to enter the refrigerant introduction tube 41 via the refrigerant pipe 57. The refrigerant is sucked into the sealed vessel 30 of the compressor 11. Moreover, the refrigerant sucked into the sealed vessel 30 is combined with the intermediate pressure refrigerant compressed by the first compression element 32. The oil sucked into the sealed vessel 30 together with the refrigerant is separated from the refrigerant in the sealed vessel 30 to return to an oil reservoir formed at a bottom portion. In consequence, the oil discharged from the compressor 11 can be returned into the sealed vessel 30.

Especially, as in the heating operation described above in detail, the density difference between the carbon dioxide refrigerant and the oil largely differs with the temperature and the refrigerant pressure (FIGS. 6 and 7). Therefore, in the flow divider having the conventional structure to divide the one refrigerant from the upper part or the lower part of the flow divider, it is not possible to cope with such a fluctuation of the density difference between the refrigerant and the oil. It has been difficult to constantly pass the oil together with the one refrigerant through the auxiliary circuit. Therefore, since the oil cannot be returned to the compressor 11 via the auxiliary circuit, the oil in the compressor 11 decreases, and oil shortage might be caused. In addition, the oil circulates through the refrigerant circuit 10 together with the other refrigerant, and the oil is accumulated in the refrigerant circuit 10. The problem occurs that the satisfactory flow of the refrigerant is hampered and the pressure loss is generated, and the deterioration of the performance of the whole air conditioning device might be caused.

However, in a case where the flow divider 14 for cooling is configured so that the one refrigerant branches from the upper and lower parts, even when the density of the oil is larger or smaller than that of carbon dioxide, the oil can branch from the upper part or the lower part, be passed through the auxiliary circuit 75 for cooling together with the one refrigerant, and securely returned into the sealed vessel 30 of the compressor 11 from the circuit 75.

On the other hand, the other refrigerant (the second refrigerant flow) divided by the flow divider 14 for cooling reaches the expansion valve 21 for cooling via the refrigerant pipe 58 connected to the other outlet of the flow divider 14 for cooling. It is to be noted that at the inlet of the expansion valve 21 for cooling, the other refrigerant discharged from the flow divider 14 for cooling still has a supercritical state. While the refrigerant flows through the expansion valve 21 for cooling, the pressure drops to obtain the two-phase mixed state of the gas/the liquid, and the refrigerant enters the heat exchanger 24 for cooling in this state. In this exchanger, the refrigerant having the pressure reduced by the expansion valve 21 for cooling is subjected to the heat exchange between the refrigerant and the surrounding outside air to evaporate. at this time, the surrounding air is cooled by a heat absorption effect. The cooled air is sent into the car chamber by the fan 24F to cool the inside of the car.

On the other hand, the refrigerant discharged from the heat exchanger 24 for cooling enters the refrigerant introduction tube 40 via the refrigerant introduction tube 40A, and is sucked into the first compression element 32 which is the low pressure section of the compressor 11.

As described above, when the one refrigerant divided by the flow divider 14 for cooling is returned into the sealed vessel 30 as the intermediate pressure section of the compressor 11 during the cooling operation, it is possible to increase the amount of the refrigerant sucked into the second compression element 34, compressed and flowing through the outdoor heat exchanger 23 without increasing the circulation amount of the refrigerant passed through the refrigerant circuit 10. In consequence, the amount of the refrigerant for the heat exchange between the refrigerant and the fluid in the outdoor heat exchanger 23 increases, and the improvement of the heat exchange capability in the outdoor heat exchanger 23 can be achieved. Furthermore, the refrigerant which has radiated heat in the outdoor heat exchanger 23 is passed through the auxiliary heat exchanger 18 for cooling. The heat exchange between the refrigerant before divided by the flow divider 14 for cooling and the one refrigerant divided by the flow divider 14 for cooling can be performed to thereby further cool the refrigerant cooled by the outdoor heat exchanger 23.

Especially, in the present invention, the refrigerant flowing through the passage 18B of the auxiliary heat exchanger 18 for cooling of the refrigerant circuit 10 still has a supercritical state. That is, a capacity of the auxiliary heat exchanger 18 for cooling is proportional to a temperature difference. Therefore, to lower the temperature of the refrigerant before entering the expansion valve 21 for cooling and generate a low temperature on supercritical conditions is advantageous for the capacity of the auxiliary heat exchanger 18 for cooling. In consequence, improvement of heat radiation capability can be achieved with a compact structure and at low cost as compared with the conventional heat exchanger which performs the heat exchange between the refrigerant and the air.

As described above, the refrigerant which has radiated heat in the outdoor heat exchanger 23 is further cooled by the auxiliary heat exchanger 18 for cooling, then insulated and expanded by the heat exchanger 24 for cooling. In consequence, it is possible to obtain an effect that the specific enthalpy of the refrigerant entering the heat exchanger 24 for cooling can be reduced and a lower temperature can be generated in the heat exchanger 24 for cooling. In consequence, a freezing effect of the heat exchanger 24 for cooling can be improved.

Especially, when the one refrigerant divided by the flow divider 14 for cooling is returned into the sealed vessel 30 as the intermediate pressure section of the compressor 11, the amount of the refrigerant compressed by the first compression element 32 of the compressor 11 can be reduced. Therefore, the compression power of the compressor 11 can be suppressed, and the operation efficiency can be improved.

Figure 11:
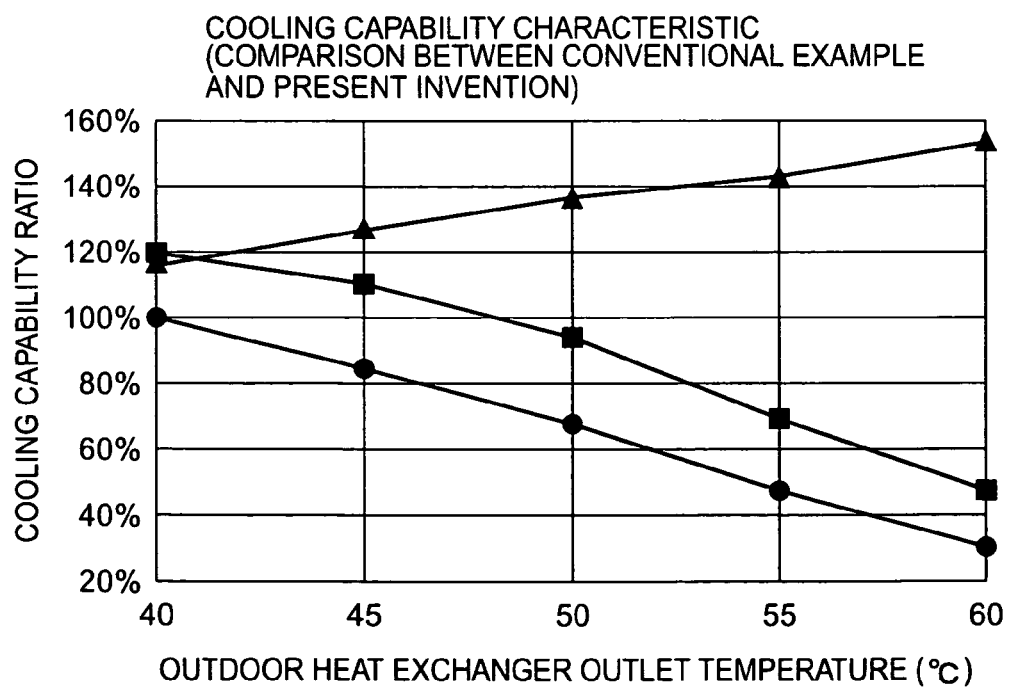
FIG. 11 is a diagram showing cooling capability characteristics of an air conditioning device of the present invention and a conventional air conditioning device.

FIG. 11 shows cooling capability characteristics in a case where the inside of the car chamber is cooled using the refrigerant circuit 10 of the present embodiment and cooling capability characteristics in a case where the inside of the car chamber is cooled using a conventional refrigerant circuit. In FIG. 11, black circles show cooling characteristics of a conventional air conditioning device, and black squares show cooling characteristics of the air conditioning device of the present invention. Triangles show ratios (the heating characteristics of the air conditioning device of the present invention/the heating characteristics of the conventional air conditioning device) of the cooling capability characteristics of the present invention to the conventional cooling capability characteristics.

As apparent from FIG. 11, it is seen that when the present invention is applied, the cooling capability is improved as compared with the conventional air conditioning device. Especially, as shown by triangular (the cooling characteristics of the air conditioning device of the present invention/the cooling characteristics of the conventional air conditioning device) in the drawing, when the outdoor heat exchanger 23 has a high outlet temperature and severe conditions during the cooling, a larger effect is obtained in the air conditioning device to which the present invention has been applied.

As described above, according to the present invention, it is possible to improve the efficiency and the performance of the air conditioning device using the carbon dioxide refrigerant.

(3) Drying Operation Time

In addition, when humidity in the car chamber rises, a windshield is fogged, vision deteriorates, and a trouble might be caused in driving. Therefore, the inside of the car chamber needs to be dried. Next, such a drying operation will be described. During the drying operation, to allow the refrigerant to flow as shown in arrows in FIG. 10 in the same manner as in the cooling operation, the control means totally closes the expansion valve 20 for heating, the auxiliary expansion valve 15 for heating and the electromagnetic valve 27, and controls open degrees of the auxiliary expansion valve 16 for cooling and the expansion valve 21 for cooling so that the pressures of the refrigerants flowing through the valves can be reduced (FIG. 5). It is to be noted that air in the car chamber passes through the heat exchanger 4 for heating from the car chamber via an air circulating duct (not shown), and is circulated into the car chamber via the heat exchanger 24 for cooling. This cycle is repeated.

During the drying operation, the control means operates the circulation pump 5 to circulate the fluid of the waste heat utilization circuit 1, and also operates the fan 4F of the heat exchanger 4 for heating. In this case, as described above, when the heat source 2 has a low temperature, for example, immediately after starting the heat source 2, the three-way valve 8 is controlled so that the fluid flows from the pipe 5A to the bypass pipe 7A. When the temperature of the heat source 2 rises, for example, to the predetermined temperature set beforehand, the control means controls the three-way valve 8 so that the fluid flows from the pipe 5A to the pipe 5B.

In consequence, the fluid heated by the cascade heat exchanger 12 or the heat source 2 and flowing through the waste heat utilization circuit 1 radiates heat by heat exchange between the fluid and the surrounding air in the heat exchanger 4 for heating. Moreover, the air heated by the heat taken from the fluid is sent to the heat exchanger 24 for cooling of the refrigerant circuit 10 by the fan 4F. At this time, a moisture (humidity) included in the air from the car chamber condenses on the surface of the heat exchanger 24 for cooling, and falls as water droplets, while the air passes through the heat exchanger 24 for cooling. In consequence, the moisture (humidity) included in the air can be removed.

The air from which the moisture has been removed by the heat exchanger 24 for cooling repeats a cycle of being sent into the car chamber by the fan 24F. In consequence, the humidity in the car chamber gradually lowers, and the above-described fog on the windshield can effectively be removed.

It is to be noted that in a case where two compression elements are driven as the compressor 11 by one driving shaft as in the refrigerant circuit 10 of the air conditioning device of the present embodiment described above in detail, the pressure (the intermediate pressure) of the intermediate pressure section is determined by a displacement capacity ratio between the first compression element 32 and the second compression element 34, a product of volume efficiencies and pressure and temperature conditions of the refrigerant sucked by the first compression element 32. In the refrigerant circuit 10 of the present embodiment, a mass flow rate (a refrigerant amount) of the one refrigerant flowing through the passage 18B of the auxiliary heat exchanger 18 for cooling of the auxiliary circuit 75 for cooling which achieves the maximum efficiency during the cooling operation is 40% or more and 60% or less of the other refrigerant flowing through the heat exchanger 24 for cooling. To achieve this, the displacement capacity ratio between the first compression element 32 and the second compression element 34 is 70% or more and 85% or less. Therefore, when the ratio of the displacement capacity of the second compression element 34 to that of the first compression element 32 is set to 70% or more and 85% or less, the maximum efficiency can be achieved.

(4) Control of Auxiliary Pressure Reduction Unit

Furthermore, to operate the above air conditioning device efficiently, amounts of the one refrigerant and the other refrigerant divided by the flow divider (the flow divider 13 for heating or the flow divider 14 for cooling) and the auxiliary circuit (the auxiliary circuit 70 for heating or the auxiliary circuit 75 for cooling) need to be controlled to reduce the specific enthalpy of the refrigerant entering the outdoor heat exchanger 23 during the heating operation and to reduce the specific enthalpy of the refrigerant entering the heat exchanger 24 for cooling during the cooling operation.

Therefore, the refrigerant pressure and temperature need to be detected, and the device needs to be controlled so as to realize an optimum operation based on these pressure and temperature. However, the detection of the refrigerant pressure is more expensive than that of the temperature. Especially, the carbon dioxide refrigerant has a very high pressure when compressed. In this case, during use, there is a large problem in performance or reliability of pressure detection means itself or reliability of an attaching portion of the pressure detection means.

Figure 12:
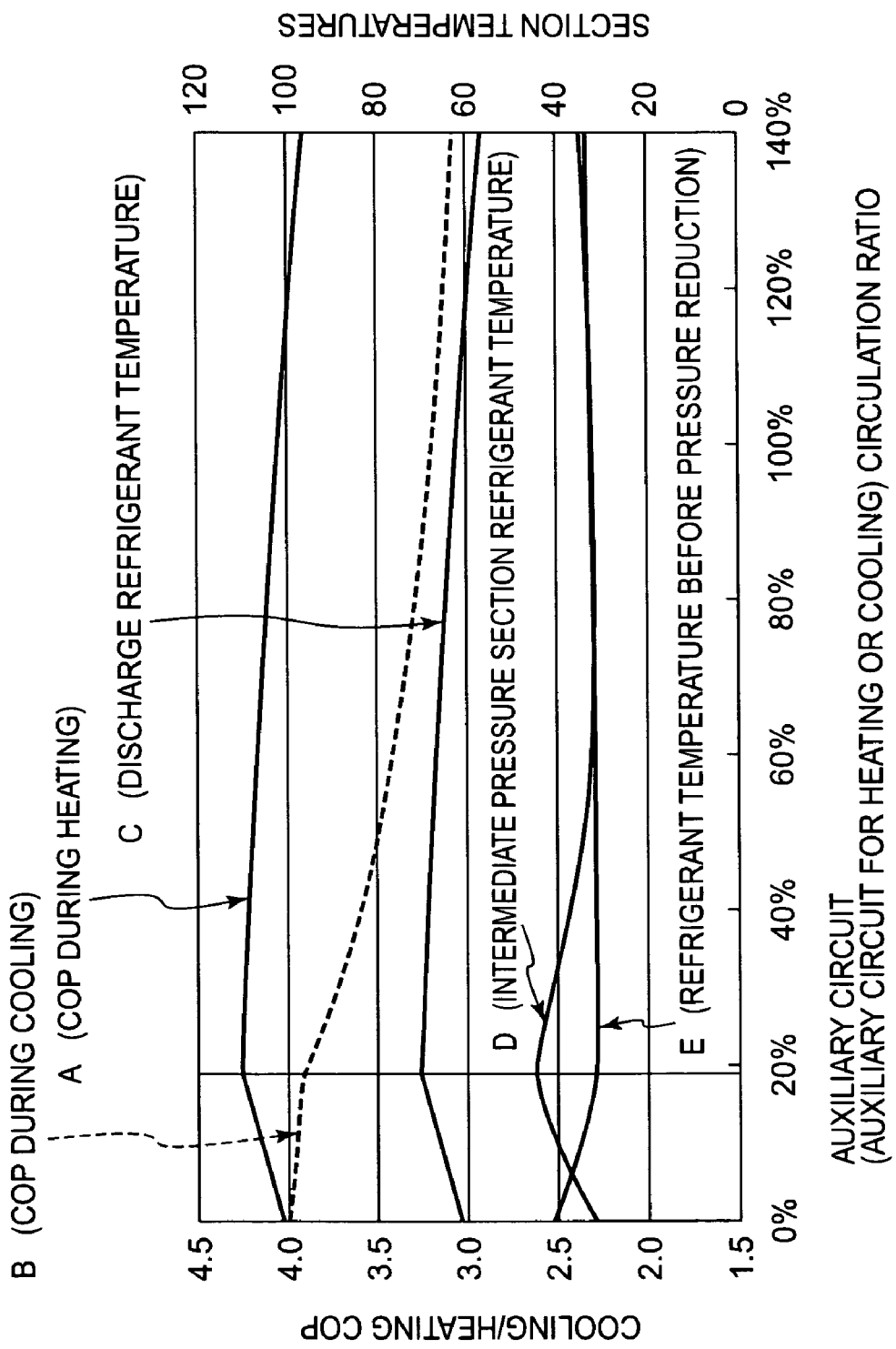
FIG. 12 is a diagram showing section temperatures and performance coefficients along with changes of a circulation ratio of a refrigerant flowing through an auxiliary circuit.

To solve the problem, in the air conditioning device of the present embodiment, it is assumed that the control means controls the amounts of the one refrigerant and the other refrigerant flowing through the auxiliary circuit (the auxiliary circuit 70 for heating or the auxiliary circuit 75 for cooling) based on the refrigerant temperature in the refrigerant circuit 10. FIG. 12 shows changes of temperatures and changes of coefficients of performances (COP) of sections in a case where a circulation ratio (a ratio (G2/G1) between an amount G2 of the one refrigerant and an amount G1 of the other refrigerant divided by the flow divider 13 or 14) of the one refrigerant flowing through the auxiliary circuit (the auxiliary circuit 70 for heating or the auxiliary circuit 75 for cooling) is changed. In FIG. 12, a solid line A shows the coefficient of the performance during the heating operation; a broken line B shows the coefficient of the performance during the cooling operation; a solid line C shows a temperature of the refrigerant gas discharged from the compressor 11; a solid line D shows a refrigerant temperature (a second stage suction temperature) in the sealed vessel 30 which is the intermediate pressure section of the compressor 11; and a solid line E shows a temperature (a temperature before the expansion valve) of the refrigerant entering the main pressure reduction unit (the expansion valve 20 for heating during the heating operation or the expansion valve 21 for cooling during the cooling operation), respectively.

As shown in FIG. 12, in a case where the circulation ratio of the refrigerant flowing through the auxiliary circuit is 0% to about 20%, as the amount of the refrigerant flowing through the auxiliary circuit increases, the temperature (the temperature before the expansion valve) of the refrigerant entering the main pressure reduction unit (the expansion valve 20 for heating during the heating operation or the expansion valve 21 for cooling during the cooling operation) drops, and the refrigerant temperature of the intermediate pressure section rises. Moreover, when the refrigerant amount is about 20%, the temperature of the refrigerant entering the main pressure reduction unit (the expansion valve 20 for heating during the heating operation or the expansion valve 21 for cooling during the cooling operation) indicates the minimum value, and the refrigerant temperature of the intermediate pressure section indicates the maximum value. At this time, the coefficient of the performance (COP) during the heating operation indicates the best value. When the amount is 0% to about 20%, the coefficient of the performance during the cooling operation hardly changes and indicates a satisfactory value.

However, when the circulation ratio of the refrigerant flowing through the auxiliary circuit exceeds 20%, the temperature (the temperature before the expansion valve) of the refrigerant entering the main pressure reduction unit (the expansion valve 20 for heating during the heating operation or the expansion valve 21 for cooling during the cooling operation) gradually rises, and the refrigerant temperature of the intermediate pressure section also gradually drops. It is also seen that when the ratio exceeds 20%, the coefficients of the performances during the heating operation and the cooling operation also drop. This is supposedly because the amount of the refrigerant flowing through the auxiliary circuit is excessively large, and a surplus which cannot be used in the heat exchange between the refrigerant and the high pressure side refrigerant is generated in the auxiliary heat exchanger (the auxiliary heat exchanger 17 for heating during the heating operation or the auxiliary heat exchanger 18 for cooling during the cooling operation).

As described above, the refrigerant amount (the circulation ratio) at which the temperature (the temperature before the expansion valve) of the refrigerant entering the main pressure reduction unit (the expansion valve 20 for heating during the heating operation or the expansion valve 21 for cooling during the cooling operation) indicates the minimum value agrees with the refrigerant amount at which the refrigerant temperature of the intermediate pressure section indicates the maximum value. At this time, the coefficient of the performance (COP) indicates the satisfactory value. Therefore, it is assumed that to operate the air conditioning device more efficiently, the control means controls the open degree of the auxiliary pressure reduction unit (the auxiliary expansion valve 15 for heating during the heating operation or the auxiliary expansion valve 16 for cooling during the cooling operation) as follows.

That is, during the heating operation, the control means controls the open degree of the auxiliary expansion valve 15 for heating based on the temperature of the refrigerant entering the expansion valve 20 for heating, detected by the refrigerant temperature sensor 48S, so that the refrigerant temperature detected by the refrigerant temperature sensor 48S indicates the minimum value of the refrigerant in the refrigerant circuit 10. The means also controls the open degree based on the refrigerant temperature in the sealed vessel 30 as the intermediate pressure section of the compressor 11, detected by the refrigerant temperature sensor 30S, so that the refrigerant temperature detected by the refrigerant temperature sensor 30S indicates the maximum value in the refrigerant circuit 10.

Moreover, during the cooling operation, the control unit controls the open degree of the auxiliary expansion valve 16 for cooling based on the temperature of the refrigerant entering the expansion valve 21 for cooling, detected by the refrigerant temperature sensor 58S, so that the refrigerant temperature detected by the refrigerant temperature sensor 58S indicates the minimum value. The means also controls the open degree of the auxiliary expansion valve 16 for cooling based on the refrigerant temperature in the sealed vessel 30 as the intermediate pressure section of the compressor 11, detected by the refrigerant temperature sensor 30S, so that the refrigerant temperature detected by the refrigerant temperature sensor 30S indicates the maximum value.

When the auxiliary expansion valve 15 for heating and the auxiliary expansion valve 16 for cooling are controlled in this manner, the coefficient of the performance (COP) indicates a satisfactory value as shown in FIG. 12. In consequence, the air conditioning device can be controlled at low cost, and the efficiency can further be improved.

(5) Control of Heating Operation at Low Outside Air Temperature or the Like

On the other hand, during the above-described heating operation, there is a case where the car chamber is required to be heated at an early stage regardless of the efficiency at a low outside air temperature, for example, immediately after the start. In this case, it is preferable that more refrigerant is passed through the auxiliary circuit 70 for heating and that the amount of the refrigerant flowing through the cascade heat exchanger 12 is increased. However, if the refrigerant is excessively passed through the auxiliary circuit 70 for heating, it is not possible to perform sufficient heat exchange between the refrigerant flowing through the passage 17B and the refrigerant flowing through the passage 17A in the auxiliary heat exchanger 17 for heating. The temperature of the refrigerant sucked into the intermediate pressure section might remarkably drop, or the refrigerant might remain to be liquid when sucked into the compressor 11.

Figure 13:
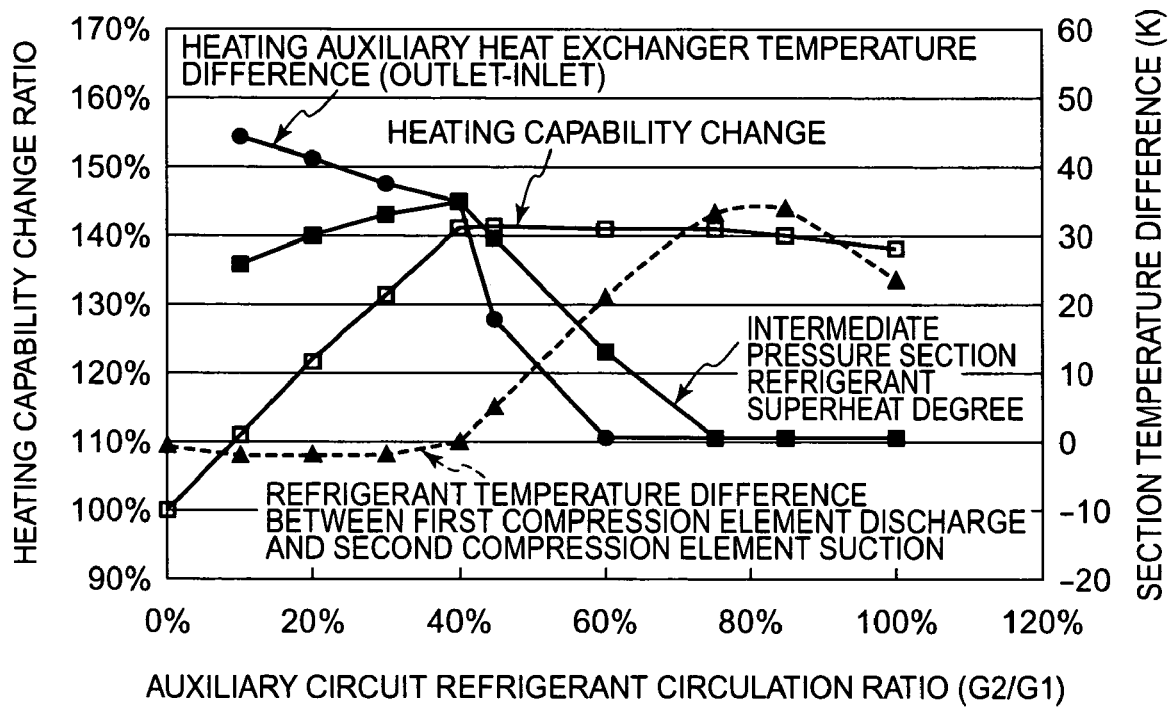
FIG. 13 is a diagram showing changes of section temperatures and heating capability along with changes of a circulation ratio of a refrigerant flowing through an auxiliary circuit for heating.

To solve the problem, the amount of the refrigerant flowing through the auxiliary circuit 70 for heating needs to be controlled so that an optimum amount of the one refrigerant returns to the intermediate pressure section. FIG. 13 shows changes of the heating capability and the section temperatures in a case where the circulation ratio of the one refrigerant flowing through the auxiliary circuit 70 for heating is changed at the low outside air temperature. In FIG. 13, the abscissa indicates the circulation ratio (G2/G1) between the amount G2 of the one refrigerant and the amount G1 of the other refrigerant divided by the flow divider 13 for heating.

As shown in FIG. 13, it is seen that when the circulation ratio of the refrigerant flowing through the auxiliary circuit 70 for heating is about 40% or less, the heating capability remarkably drops. When the ratio is around 40% to 80%, the capability substantially becomes constant. When the ratio exceeds 80%, the capability deteriorates. When the circulation ratio exceeds 80% in this manner, a superheat degree of the refrigerant in the sealed vessel 30 as the intermediate pressure section of the compressor 11 cannot be taken (i.e., the superheat degree is 0 as shown by a black square plot of FIG. 13). Therefore, the liquid refrigerant might return from the auxiliary circuit 70 for heating to the intermediate pressure section of the compressor 11. Therefore, when such a liquid refrigerant is sucked into the second compression element 34 to compress the liquid, a disadvantage of failure of the compressor 11 occurs.

On the other hand, it is seen that when a temperature difference (the temperature of the one refrigerant discharged from the auxiliary heat exchanger 17 for heating—the temperature of the one refrigerant entering the auxiliary heat exchanger 17 for heating) between the outlet and the inlet of the auxiliary heat exchanger 17 for heating exceeds 20 K as shown by a black circle plot of FIG. 13, as shown by a black triangle plot of FIG. 13, there is hardly a difference between the temperature of the refrigerant sucked into the second compression element 34 and the temperature of the refrigerant discharged from the first compression element 32. The temperature of the refrigerant sucked into the second compression element 34 is rather lower than the temperature of the refrigerant discharged from the first compression element 32. This is supposedly because an excessively small amount of the one refrigerant flows through the auxiliary circuit 70 for heating. In consequence, since it is not possible to obtain an effect that the refrigerant flowing through the passage 17A can sufficiently be cooled in the auxiliary heat exchanger 17 for heating, it is considered that the heating capability deteriorates.

As described above, in a case where the heating capability is required, the control unit controls the open degree of the auxiliary expansion valve 15 for heating based on the refrigerant temperatures detected by the refrigerant temperature sensor 41S and the refrigerant temperature sensor 47S so that temperature of the one refrigerant discharged from the internal heat exchanger to enter the auxiliary heat exchanger 17 for heating—the temperature of the one refrigerant entering the internal heat exchanger is 20 K or less. The unit also controls the open degree based on the refrigerant temperature detected by the refrigerant temperature sensor 30S so that the superheat degree of the refrigerant of the intermediate pressure section of the compressor 11 is 2 K or more.

As described above, the open degree of the auxiliary expansion valve 15 for heating is controlled so that the temperature of the one refrigerant discharged from the internal heat exchanger—the temperature of the one refrigerant entering the internal heat exchanger is 20 K or less. In consequence, the amount of the refrigerant returning into the sealed vessel 30 which is the intermediate pressure section of the compressor 11 can be increased. Furthermore, the open degree of the auxiliary expansion valve 15 for heating is controlled based on the refrigerant temperature detected by the refrigerant temperature sensor 30S so that the superheat degree of the refrigerant of the intermediate pressure section of the compressor 11 is 2 K or more. In consequence, a disadvantage of refrigerant liquid backflow can be eliminated. Therefore, while reliability of the compressor is secured, the improvement of the heating capability can be achieved.

It is to be noted that in the present embodiment, the open degree of the auxiliary expansion valve 15 for heating is controlled so that the temperature of the one refrigerant discharged from the internal heat exchanger to enter the auxiliary heat exchanger 17 for heating—the temperature of the one refrigerant entering the internal heat exchanger is 20 K or less. Moreover, the degree is controlled based on the refrigerant temperature detected by the refrigerant temperature sensor 30S so that the superheat degree of the refrigerant of the intermediate pressure section of the compressor 11 is 2 K or more. However, the present invention is not limited to this embodiment. The open degree of the auxiliary expansion valve 15 for heating may be controlled so that the temperature of the refrigerant sucked into the second compression element 34 of the compressor 11—the temperature of the refrigerant discharged from the first compression element 32 indicates a positive value. The degree may be controlled based on the refrigerant temperature detected by the refrigerant temperature sensor 30S so that the superheat degree of the refrigerant of the intermediate pressure section of the compressor 11 is 2 K or more.

Even in this case, in the same manner as in the above embodiment, while the amount of the refrigerant returning to the sealed vessel 30 as the intermediate pressure section of the compressor 11 is increased, the disadvantage of the refrigerant liquid backflow can be eliminated. While the reliability of the compressor is secured, the improvement of the heating capability can be achieved.

What is claimed is:

1. An air conditioning device comprising:
a waste heat utilization circuit which circulates a fluid through a heat source and a heat exchanger for heating and in which waste heat of the heat source is utilized in heating a room to be conditioned in the heat exchanger for heating;
a refrigerant circuit in which carbon dioxide is used as a refrigerant and which has a supercritical pressure on a high pressure side; and
a cascade heat exchanger which performs heat exchange between the fluid flowing from the heat source to the heat exchanger for heating in the waste heat utilization circuit and the refrigerant of the refrigerant circuit,
the refrigerant circuit including a compressor, the cascade heat exchanger, a flow divider, an auxiliary pressure reduction unit, an internal heat exchanger, a main pressure reduction unit and a heat absorber disposed externally from the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, the other divided refrigerant being passed from the main pressure reduction unit to the heat absorber and being then sucked into a low pressure section of the compressor, wherein:
the air conditioning device further comprises a temperature detection unit for detecting a temperature of the refrigerant of the intermediate pressure section of the compressor, and
the air conditioning device is configured to control an open degree of the auxiliary pressure reduction unit so that the temperature detected by the temperature detection unit indicates the maximum value.

2. An air conditioning device comprising:
a waste heat utilization circuit which circulates a fluid through a heat source and a heat exchanger for heating and in which waste heat of the heat source is utilized in heating a room to be conditioned in the heat exchanger for heating;
a refrigerant circuit in which carbon dioxide is used as a refrigerant and which has a supercritical pressure on a high pressure side; and
a cascade heat exchanger which performs heat exchange between the fluid flowing from the heat source to the heat exchanger for heating in the waste heat utilization circuit and the refrigerant of the refrigerant circuit,
the refrigerant circuit including a compressor, the cascade heat exchanger, a flow divider, an auxiliary pressure reduction unit, an internal heat exchanger, a main pressure reduction unit and a heat exchanger for cooling which cools the main pressure reduction unit and the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, the other divided refrigerant being passed from the main pressure reduction unit to the heat exchanger for cooling and being then sucked into a low pressure section of the compressor, wherein:
the air conditioning device further comprises a temperature detection unit for detecting a temperature of the refrigerant of the intermediate pressure section of the compressor, and
the air conditioning device is configured to control an open degree of the auxiliary pressure reduction unit so that the temperature detected by the temperature detection unit indicates the maximum value.

3. An air conditioning device comprising:
a waste heat utilization circuit which circulates a fluid through a heat source and a heat exchanger for heating and in which waste heat of the heat source is utilized in heating a room to be conditioned in the heat exchanger for heating;
a refrigerant circuit in which carbon dioxide is used as a refrigerant and which has a supercritical pressure on a high pressure side; and
a cascade heat exchanger which performs heat exchange between the fluid flowing from the heat source to the heat exchanger for heating in the waste heat utilization circuit and the refrigerant of the refrigerant circuit,
the refrigerant circuit including a compressor, the cascade heat exchanger, a flow divider, an auxiliary pressure reduction unit, an internal heat exchanger, a main pressure reduction unit, a heat absorber disposed externally from the room to be conditioned and a heat exchanger for cooling which cools the room to be conditioned, the refrigerant discharged from the compressor being passed through the cascade heat exchanger, the refrigerant discharged from the cascade heat exchanger being divided by the flow divider, one divided refrigerant being passed from the auxiliary pressure reduction unit to the internal heat exchanger to perform heat exchange between the refrigerant and the refrigerant discharged from the cascade heat exchanger and being then sucked into an intermediate pressure section of the compressor, during heating, the other divided refrigerant being passed from the main pressure reduction unit to the heat absorber and being then sucked into a low pressure section of the compressor, during cooling, the other divided refrigerant being passed from the main pressure reduction unit to the heat exchanger for cooling and being then sucked into the low pressure section of the compressor.

4. The air conditioning device according to any one of claim 1 to 3, wherein the internal heat exchanger performs heat exchange between one refrigerant passed through the auxiliary pressure reduction unit and the refrigerant which has been discharged from the cascade heat exchanger and which has not been divided by the flow divider.

5. The air conditioning device according to any one of claims 1 to 3, wherein one refrigerant is divided from an upper part and a lower part of the flow divider.

6. The air conditioning device according to any one of claims 1 to 3, wherein the compressor includes a low stage side compression unit and a high stage side compression unit; the refrigerant discharged from the heat absorber or the heat exchanger for cooling is sucked into the low stage side compression unit;

an intermediate pressure refrigerant compressed by the low stage side compression unit is sucked into the high stage side compression unit together with one refrigerant discharged from the internal heat exchanger; and a ratio of a displacement capacity of the high stage side compression unit to that of the low stage side compression unit is set to 70% or more and 85% or less.

7. The air conditioning device according to claim 3, further comprising:

a temperature detection unit for detecting a temperature of the refrigerant of the intermediate pressure section of the compressor, the device being configured to control an open degree of the auxiliary pressure reduction unit so that the temperature detected by temperature detection unit indicates the maximum value.

* * * * *